(12) United States Patent
Wang et al.

(10) Patent No.: US 7,298,328 B2
(45) Date of Patent: Nov. 20, 2007

(54) SYSTEMS AND METHODS FOR GEOGRAPHIC POSITIONING USING RADIO SPECTRUM SIGNATURES

(76) Inventors: Jackson Wang, 26 Chelford Road, Toronto, Ontario (CA) M3B 2E5; Glenn Hauck, 132A Gledhill Avenue, East York, Ontario (CA) M4C 5K8; Dan Nephin, 291 Avenue Road Unit 805, Toronto, Ontario (CA) M4V 2G9

( * ) Notice: Subject to any disclaimer, the term of this patent is extended or adjusted under 35 U.S.C. 154(b) by 0 days.

(21) Appl. No.: 11/011,222

(22) Filed: Dec. 13, 2004

(65) Prior Publication Data

US 2006/0125692 A1   Jun. 15, 2006

(51) Int. Cl.
*G01S 5/02* (2006.01)
(52) U.S. Cl. ..................................... 342/451
(58) Field of Classification Search ............... 342/386, 342/451
See application file for complete search history.

(56) References Cited

U.S. PATENT DOCUMENTS

| | | | |
|---|---|---|---|
| 5,068,838 A * | 11/1991 | Klausner et al. ............... 368/47 |
| 5,280,642 A * | 1/1994 | Hirata et al. ............. 455/186.1 |
| 5,406,626 A | 4/1995 | Ryan |
| 5,507,024 A | 4/1996 | Richards, Jr. |
| 5,654,719 A * | 8/1997 | Kunii .......................... 342/451 |
| 6,064,339 A * | 5/2000 | Wax et al. ................... 342/417 |
| 6,112,064 A | 8/2000 | Arrowsmith |
| 6,167,274 A * | 12/2000 | Smith ....................... 455/456.3 |
| 6,240,280 B1 | 5/2001 | Ravi |
| 6,269,246 B1 * | 7/2001 | Rao et al. ................. 455/456.3 |
| 6,496,701 B1 * | 12/2002 | Chen et al. ............... 455/456.5 |
| 6,625,464 B1 | 9/2003 | Bandy |
| 6,662,341 B1 | 12/2003 | Cooper |
| 2002/0183059 A1 | 12/2002 | Noreen et al. |
| 2002/0183102 A1 | 12/2002 | Withers et al. |
| 2003/0186662 A1 | 10/2003 | Himmel et al. |

(Continued)

FOREIGN PATENT DOCUMENTS

WO  WO 03/101140 A1 * 12/2003
WO  WO 2006/007442 A2   1/2006

OTHER PUBLICATIONS

Bahl et al., 2000, "RADAR: An In-Building RF-Based Location and Tracking System," IEEE Infocom: 775-784.

(Continued)

*Primary Examiner*—Gregory C Issing
(74) *Attorney, Agent, or Firm*—Jones Day; Brett Lovejoy

(57) ABSTRACT

Methods, radios, components thereof, and other devices for localizing a geographic position of a radio receiver are provided. A current radio signature is obtained. The current radio signature comprises a plurality of measured signal qualities that collectively represent a frequency spectrum. Each measured signal quality in the plurality of measured signal qualities corresponds to a portion of the frequency spectrum. The current radio signature is compared with a plurality of reference radio signatures. Each reference radio signature in the plurality of reference radio signatures is associated with a global position. When the comparing identifies a unique match between the current radio signature and a reference radio signature in the plurality of reference radio signatures, the radio receiver is deemed to be localized to the global position associated with the reference radio signature.

63 Claims, 12 Drawing Sheets

U.S. PATENT DOCUMENTS

2004/0203885 A1  10/2004  Quaid
2004/0219927 A1  11/2004  Sumner
2005/0020210 A1* 1/2005  Krumm et al. ............ 455/41.2

OTHER PUBLICATIONS

Borriello et al., 2005, "Delivering Real-World Ubiquitous Location Systems," Communications of the ACM 48: 36-41.

Gerrits et al., 2004, "UWB considerations for 'my personal global adaptive network' (MAGNET) systems," Proceedings of the 30th European Solid=State Circuits Conference (ESSCIRC), Leuven, Belgium, 45-56.

Hightower et al., 2005, "Learning and Recognizing the Places We Go," Proceedings of the Seventh International Conference on Ubiquitous Computing (Ubicomp 2005): 159-176.

Hightower et al., 2001, "Location Systems for Ubiquitous Computing," IEEE Computer 34: 57-66.

Krumm et al., 2003, "RightSPOT: A Novel Sense of Location for a Smart Personal Object," UbiComp: 36-43.

Krumm et al., 2002, "SmartMoveX on a Graph—An Inexpensive Active Badge Tracker," UbiComp 2002: 299-307.

LaMarca et al., 2005, "Place Lab: Device Positioning Using Radio Beacons in the Wild," Proceedings of the Third International Conference on Pervasive Computing.

Priyantha et al., 2000, "The Cricket Location-Support System," 6th ACM MOBICOM.

Roos et al., 2002, "A Statistical Modeling Approach to Location Estimation," IEEE Transactions on Mobile Computing 1: 59-69.

Youssef et al., 2005, "Computing Location from Ambient FM Radio Signals," IEEE Wireless Communications and Networking Conference.

"United States RBDS Standard," Apr. 9, 1998, National Radio Systems Committee: 1-204.

Wright, 1998, "RBDS vs. RDS—What Are The Differences and How Can Receivers Cope With Both Systems?", National Radio Systems Committee: 1-11.

"A Glossary of Terms," May 15, 2000; pp. 1-7.

* cited by examiner

| Frequency | Transmitters | Frequency | Transmitters | Frequency | Transmitters | Frequency | Transmitters |
|---|---|---|---|---|---|---|---|
| 87.9 | 1 | 93.1 | 70 | 98.3 | 110 | 103.5 | 70 |
| 88.1 | 179 | 93.3 | 88 | 98.5 | 81 | 103.7 | 85 |
| 88.3 | 138 | 93.5 | 98 | 98.7 | 74 | 103.9 | 103 |
| 88.5 | 136 | 93.7 | 93 | 98.9 | 69 | 104.1 | 86 |
| 88.7 | 104 | 93.9 | 75 | 99.1 | 90 | 104.3 | 77 |
| 88.9 | 122 | 94.1 | 93 | 99.3 | 94 | 104.5 | 78 |
| 89.1 | 106 | 94.3 | 96 | 99.5 | 94 | 104.7 | 95 |
| 89.3 | 116 | 94.5 | 87 | 99.7 | 57 | 104.9 | 113 |
| 89.5 | 119 | 94.7 | 73 | 99.9 | 98 | 105.1 | 86 |
| 89.7 | 114 | 94.9 | 79 | 100.1 | 92 | 105.3 | 89 |
| 89.9 | 113 | 95.1 | 86 | 100.3 | 91 | 105.5 | 136 |
| 90.1 | 116 | 95.3 | 113 | 100.5 | 73 | 105.7 | 90 |
| 90.3 | 123 | 95.5 | 80 | 100.7 | 96 | 105.9 | 88 |
| 90.5 | 128 | 95.7 | 89 | 100.9 | 85 | 106.1 | 87 |
| 90.7 | 121 | 95.9 | 106 | 101.1 | 92 | 106.3 | 115 |
| 90.9 | 117 | 96.1 | 94 | 101.3 | 64 | 106.5 | 80 |
| 91.1 | 134 | 96.3 | 67 | 101.5 | 94 | 106.7 | 81 |
| 91.3 | 134 | 96.5 | 81 | 101.7 | 98 | 106.9 | 86 |
| 91.5 | 148 | 96.7 | 110 | 101.9 | 80 | 107.1 | 112 |
| 91.7 | 155 | 96.9 | 89 | 102.1 | 83 | 107.3 | 74 |
| 91.9 | 129 | 97.1 | 69 | 102.3 | 118 | 107.5 | 76 |
| 92.1 | 140 | 97.3 | 76 | 102.5 | 83 | 107.7 | 69 |
| 92.3 | 88 | 97.5 | 77 | 102.7 | 75 | 107.9 | 117 |
| 92.5 | 98 | 97.7 | 109 | 102.9 | 95 | | |
| 92.7 | 115 | 97.9 | 82 | 103.1 | 105 | | |
| 92.9 | 93 | 98.1 | 82 | 103.3 | 73 | | |

Fig. 9

SYSTEMS AND METHODS FOR GEOGRAPHIC POSITIONING USING RADIO SPECTRUM SIGNATURES

1. FIELD OF INVENTION

The present invention relates to the determination of the location of a radio receiver by comparing a measured radio signature to a lookup table comprising a plurality of radio signatures from known locations.

2. BACKGROUND OF INVENTION

Present techniques for locating electronic devices (e.g., cellular phone, personal digital assistants, computer, etc.) require technology such as (i) satellite signals (global positioning signals "GPS"), (ii) GPS and assistance via cellular signals to penetrate building structures, or (iii) triangulation using a cellular system. Each of these techniques, while useful in their own right, has the drawback that they require relatively expensive equipment and/or a subscription to an expensive data service. What is needed in the art are cheaper methods for locating the global position of an electronic device.

3. SUMMARY OF INVENTION

The present invention addresses the shortcomings found in the prior art. The present invention provides a mechanism for determining the geographic position of an electronic device using radio signals. One embodiment of the present invention provides a method of localizing a geographic position of a radio receiver. In the method, a current radio signature is obtained. This current radio signature comprises a plurality of measured signal qualities that collectively represent a frequency spectrum. Each measured signal quality in the plurality of measured signal qualities corresponds to a portion of the frequency spectrum. The current radio signature is compared to a plurality of reference radio signatures. Each reference radio signature in the plurality of reference radio signatures is associated with a global position. When the comparing identifies a unique match between the current radio signature and a reference radio signature in the plurality of reference radio signatures, the radio receiver is deemed to be localized to the global position associated with the reference radio signature.

In some embodiments, the frequency spectrum is all or a portion of the FM frequency spectrum, all or a portion of the AM frequency spectrum, all or a portion of the spectrum between 300 KHz and 3 MHz, all or a portion of the spectrum between 3 MHz and 30 MHz, or a portion of the spectrum between 30 MHz and 300 MHz, or all or a portion of the spectrum between 300 MHz and 3000 MHz. In some embodiments, a measured signal quality in the plurality of measured signal qualities is a decibel rating of a frequency in the frequency spectrum. In some embodiments, the measured signal quality in the plurality of measured signal qualities is a voltage representing a frequency in the frequency spectrum.

In some embodiments, the portion of the frequency spectrum corresponding to a first measured signal quality in the plurality of measured signal qualities is a first frequency window. In some embodiments, this first frequency window comprises a frequency spectrum that has a spectral width that is between 1 KHz and 200 KHz or between 200 KHz and 400 KHz. In some embodiments, the portion of the frequency spectrum corresponding to a second measured signal quality in the plurality of measured signal qualities is a second frequency window and a spectral width of the first frequency window and the second frequency window is the same or different.

In some embodiments, the first measured signal represents a strongest observable signal in the portion of the frequency spectrum corresponding to the first measured signal quality. In some embodiments, a second measured signal quality also corresponds to the first frequency window. In some embodiments the first measured signal quality and the second signal quality are each independently selected from the group consisting of an RDS quality, an FM multipath reading, FM level, AM level, or a phase lock.

Another aspect of the invention provides a device comprising instructions for accessing a radio signature lookup table. The radio signature lookup table comprises a plurality of reference radio signatures that collectively represent a frequency spectrum. Each reference radio signature in the plurality of reference radio signatures is associated with a global position. The device further comprises a radio signature measurement model for localizing a geographic position of a device. The radio signature measurement model comprises instructions for obtaining a current radio signature. The current radio signature comprises a plurality of measured signal qualities. Each measured signal quality in the plurality of measured signal qualities corresponds to a portion of the frequency spectrum. The device further comprises a radio signature comparison module having instructions for comparing the current radio signature to the plurality of reference radio signatures.

In some embodiments, the device further comprises instructions for accessing a radio display table. This radio display table comprises information for each global position in a plurality of global positions. Such embodiments further include a radio display module for obtaining information from the radio display table as a function of an identity of a reference radio signature uniquely identified by the instructions for comparing. In some embodiments, the device further comprises a table update module. The table update module comprises instructions for updating information in the radio display table. In some embodiments, the device further comprises a table update module. The table update module comprises instructions for updating a reference radio signature in the radio signature lookup table. The instructions for accessing a radio signature lookup table and the radio signature measurement model is embedded in one or more application specific integrated circuits (ASICs), one or more field-programmable gate arrays (FPGAs), or any combination thereof. In some embodiments, the device comprises an ASIC or FPGA. In some embodiments, the device is a component of an RDS or an HD radio.

Another aspect of the invention comprises a radio comprising means for accessing a radio signature lookup table. The radio signature lookup table comprises a plurality of reference radio signatures. Each reference radio signature in the plurality of reference radio signatures is associated with a global position. The radio further comprises means for localizing a geographic position of the radio. The radio signature measurement model further comprises instructions for obtaining a current radio signature. This current radio signature comprises a plurality of measured signal qualities that collectively represent a frequency spectrum. Each measured signal quality in the plurality of measured signal qualities corresponds to a portion of the frequency spectrum. The radio further comprises means for comparing the current radio signature to the plurality of reference radio signatures.

4. BRIEF DESCRIPTION OF THE FIGURES

FIG. 9 illustrates FM frequency distribution for Canada and the continental United States.

Like reference numerals refer to corresponding parts throughout the several views of the drawings.

5. DETAILED DESCRIPTION OF THE INVENTION

The present invention provides cost effective systems and methods for determining the location and direction of motion of a radio receiver. In the present invention, radio signal reception is polled across a spectrum of frequencies. These measurements are collectively termed a radio signature. This measured radio signature is then compared to a plurality of reference radio signatures. Each reference radio signature corresponds to a known location. For example, a first reference radio signature in the plurality of radio signatures corresponds to a first location and a second reference radio signature in the plurality of radio signatures corresponds to a second location. Direction can be obtained as the radio receiver moves across boundaries between locations with different reference radio signatures.

5.1 Exemplary Radio Receiver

Figure 1A:
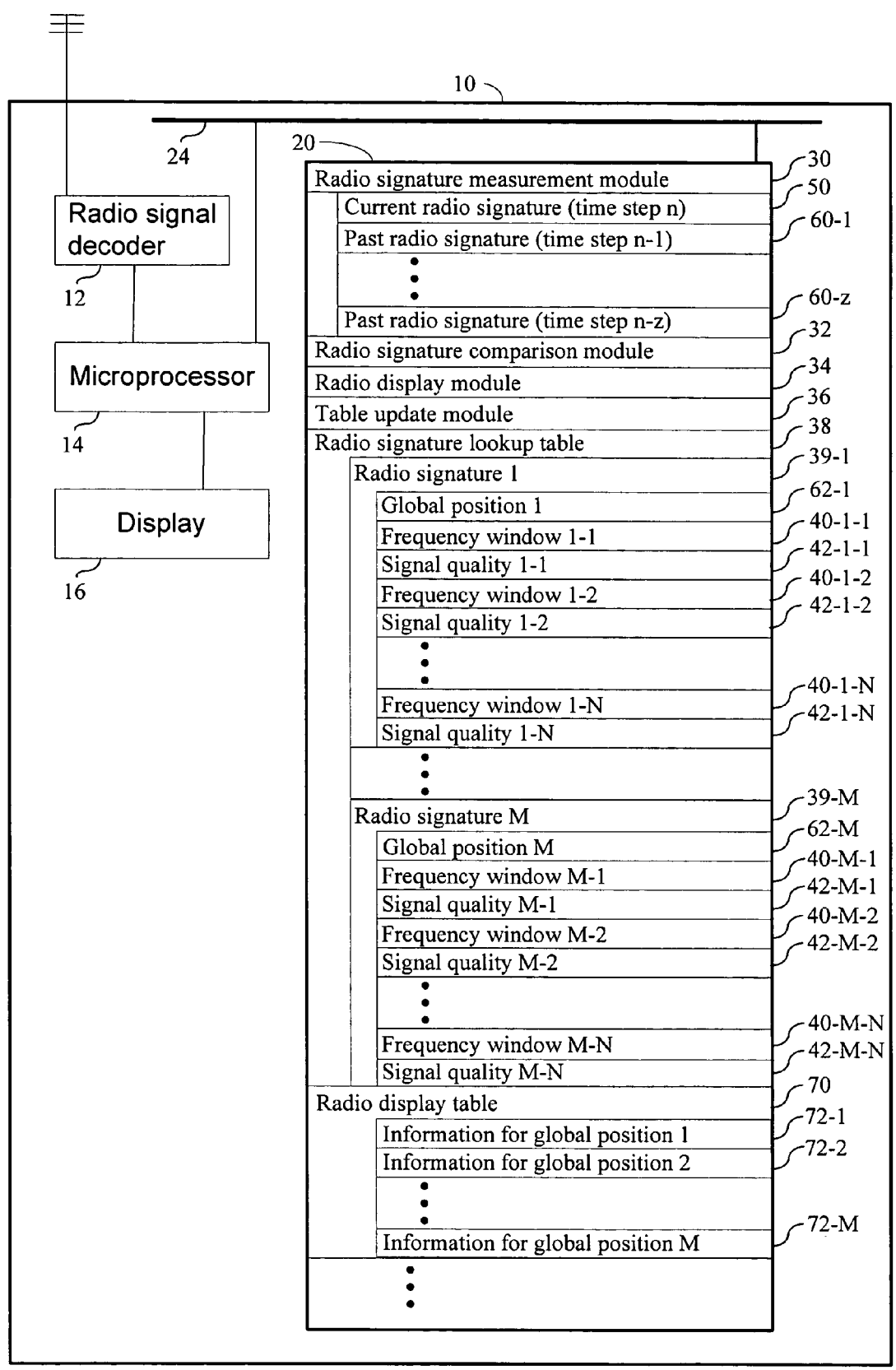
FIG. 1A illustrates a radio receiver capable of determining geographical position in accordance with an embodiment of the present invention.

Reference will now be made to FIG. 1A, which shows an exemplary radio receiver 10 in accordance with an embodiment of the present invention. Many aspects of radio receiver 10 are conventional and will not be discussed so that the inventive aspects of the present invention can be emphasized. In typical embodiments, radio receiver 10 includes a radio signal decoder 12. In preferred embodiments, radio signal decoder 12 can be controlled by a microprocessor 14 to scan a predetermined range of frequencies in order to measure signal strength across the range of frequencies.

A commercial example of a radio signal decoder 12 is the Microtune MT1390 FM module (Plano, Tex.). The MT1390 chip can be electronically tuned to any given frequency in the FM band through instructions sent to the chip by a microprocessor through an I2C port. The MT1390 chip reports signal strength at the FM frequency to which it is tuned. The MT1380 chip is designed to scan all available frequencies to allow for continuous reception of data from information systems such as Radio Data System (RDS). The RDS radio signal combines an audio feed with small amounts of text and data that can be picked up and processed by radios that have an RDS decode, such as the MT1390, built-in. Such radio receivers can display this information. The information commonly transmitted is station name (e.g., an 8-digit radio station name, such as "BBC R.4" or "Jazz FM"), program type (e.g. pop, rock, etc), a 'TA flag' that is switched on when a radio station starts a travel report, and switched off at the end (used to automatically swith the RDS radio to a station carrying travel news, or in a car, pause a cassette or a CD, when local travel news is broadcast), radio text (information that 'scrolls' across RDS radio displays, providing information that's sent from the radio station, an Enhanced Other Networks flag (EON flag) that allows an RDS radio to know about other associated stations, so a radio can know that when listening to a first radio program, it should monitor a second radio station, in case there's some travel news, an alternative frequency (AF) flag that contains information about a station's other FM frequencies, so that the radio can switch to a better signal while driving, time and date (CF flag) that carries the current date and time, resetting for daylights saving time, etc. Another example of an RDS radio is the Sony ICF-M33RDS, and the Roberts R9929, R9940, and R861. In other embodiments, radio signal decoder 12 is a high definition (HD) radio decoder. Commercial examples of the HD radio decoder include, but are not limited to, the Kenwood KTC-HR100 HD Radio tuner.

In typical embodiments, radio signal decoder 12 serves as an auxiliary radio tuner that functions as the 'background' tuner within radio receiver 10, scanning all available frequencies and allowing for continuous reception of data from information systems such as Radio Data System (RDS). As such, radio signal decoder 12 is typically combined with a primary radio tuner such as Microtune's MT1383/1384 companion AM/FM tuners for a dual-tuner AM/FM apparatus. The primary radio tuner is tuned by the user to the desired radio frequency while the auxiliary radio tuner is used to perform sweeps in accordance with the present invention and obtain information from sources such as the Radio Data System.

In the present invention, radio signal decoder 12 can be used to scan any portion of the FM frequency spectrum and/or the AM frequency spectrum in order to measure a radio signature. In the United States, the FM frequency spectrum is 88 megahertz (MHz) and 108 MHz. The AM frequency spectrum is generally between 520 kilohertz (KHz) and 1500 KHz. As such, radio signal decoder 12 can be used to scan any portion (or all) of the frequency spectrum between 520 KHz and 1500 KHz and/or between 88 MHz and 108 MHz. In some embodiments, radio signal decoder 12 can be used to scan any portion (or all) of the medium-frequency (MF) band, which has a frequency range of between 300 KHz and 3 MHz, the high-frequency (HF) band, which has a frequency range of between 3 MHz and 30 MHz, the very-high frequency band (VHF) which has a frequency range of between 30 MHz and 300 MHz, and/or the ultra-high-frequency (UHF) band, which has a frequency rang of 300 MHz to 3000 MHz. For more information on the possible bands that can be polled in order to construct a radio signature in accordance with the present invention, see Sinclair, 1997, *How Radio Signals Work*, McGraw-Hill, New York, which is hereby incorporated by reference in its entirety.

Microprocessor 14 can be a component of radio signal decoder 12 or a standalone component. In some embodiments, the functionality of radio signal decoder 12 and/or microprocessor 14 is embedded in one or more application specific integrated circuits (ASICs) and/or field-programmable gate arrays (FPGAs). In some embodiments, microprocessor 14 is implemented as one or more digital signal processors (DSPs). In these embodiments, microprocessor 14 is considered any combination of chips, including any combination of ASICs, FPGAs, DSPs, or other forms of microchips known in the art. In general, any type of microarchitecture that can store or access from memory approximately one megabyte of data and has about one megaflop or greater of computing power is suitable for implementing preferred embodiments of the present invention.

Radio receiver 10 includes a display 16 for displaying the RDS data feed and/or navigational information provided by the present invention. In some embodiments, display 16 is an 8 to 16 character alphanumeric display. In other embodiments, display 16 supports between 8 and 100 characters. In still other embodiments, display 16 is a graphical display.

Memory 20 can be random access memory (RAM). All or a portion of this RAM can be on board, for example, an FPGA or ASIC. In some embodiments, the RAM is external to microprocessor 14. Alternatively, memory 20 is SDRAM available to a DSP or a FPGA that has an embedded SDRAM controller. In some embodiments, memory 20 is some combination of on-board RAM and external RAM. In some embodiments memory 20 includes a read only memory (ROM) component and a RAM component.

Memory 20 includes software modules and data structures that are used by microprocessor 14 to implement the present invention. While it is well known in the art that software modules and data structures can be structured in many different ways in order to implement a particular algorithm or method, one exemplary structure has been provided in FIG. 1 in order to convey certain aspects of the present invention. This exemplary structure includes a radio signature measurement model 30 for measuring a radio signature. In some embodiments, this measured radio signature is stored in memory 20 as current radio signature 50.

In some embodiments, memory 20 stores past radio signatures 60 in addition to the current radio signature 50. Past radio signatures 60 can be used in the methods of the present invention to establish the direction or to facilitate geographic positioning. Memory 32 further comprises a radio signature comparison module 32 for comparing the current measured radio signature (and possibly past measured radio signatures 60) to reference radio signatures.

Memory 20 further comprises a radio display module 34 for displaying information as a function of geographic position. For example, consider the case in which radio signature comparison module 32 determines that radio 10 is in geographic position one. In such instances, radio display module 34 will display information on display 16 associated with geographic position one. Then, when radio signature comparison module 32 determines that radio 10 is in geographic position two, module 34 will display information on display 16 associated with geographic position two.

Memory 20 further comprises a table update module 36 for updating radio signatures and global position specific information. Table update module 36 typically receives updates to such signatures from radio signals decoded by radio signal decoder 12. Such updates are typically incremental in fashion. For example, if the radio signature for a specific geographic location has changed because a radio transmitter has gone on line (or off line), a data feed in the radio signal decoded by radio signal decoder 12 transmits the updated radio signature and table update module 36 updates memory 20 accordingly.

In addition to the above-identified software modules, memory 20 comprises a radio signature lookup table 38. Radio signature lookup table 38 includes a plurality of radio signatures 39. Each radio signature 39 corresponds to a predetermined global position 62 (e.g., Chicago, Ill.). In preferred embodiments, each radio signature 39 corresponds to a geo-polygon that represents a region with a distinct FM signature that has been generated by analyzing overlapping transmitter broadcast regions. Each radio signature 39 includes a plurality of frequency windows 40 and, for each such frequency window 40, a signal quality 42. In typical embodiments, frequency windows 40 are used to circumvent the effects of phenomenon such as spectral leakage that occurs at frequencies close to those of certain transmitters. Since FM transmitters in a region are usually separated by more than 200 kHz, the occurrence of an FM signal with two adjacent FM peaks is usually representative of such spectral leakage. Such spectral leakage can be observed by tuning a radio to the next possible FM channel and discerning the sounds of an adjacent FM channel. Here, the term spectral leakage is used loosely because it has not been determined whether or not such effects are due to transmitter properties or to receiver properties. That is, it is possible that tuner specific hardware limitations cause this apparent problem. Radio signatures 39 can be referred to as reference radio signatures, and signal qualities 42 can be referred to as reference signal qualities.

In some embodiments, only the maximum value within a given frequency window 40 is considered the signal quality of the window. The size of each frequency window 40 is chosen to reflect the typical separation between active transmitter frequencies so that true signal peaks are not removed from the signature. Thus, in some embodiments, each frequency window 40 represents a predetermined range of frequencies (window of frequencies) and the signal quality 42 corresponding to the frequency window 40 represents the strongest observable signal in the range of frequencies. In some embodiments, radio signature 39 spans all or a portion of the FM frequency band and each frequency window 40 represents a range of 200 KHz. For example, a first frequency window 40 may represent all frequencies between 88.0 MHz and 88.2 MHz, a second frequency window 40 may represent all frequencies between 88.2 MHz and 88.4 MHz and so forth. In this example, the signal quality 42 corresponding to the first frequency window 40 is a value representing the strongest measured signal between 88.0 MHz and 88.2 MHz for the corresponding geographical location, the signal quality 42 corresponding to the second frequency window 40 is a value representing the strongest measured signal between 88.2 MHz and 88.4 MHz for the corresponding geographical location, and so forth. In fact, FM signal strength (level) alone can potentially yield one hundred plus frequency windows 40 of binning and 87.7 to 107.9 Mhz by 200 KHz is a well accepted frequency raster spacing.

In some embodiments, each frequency window 40 represents a frequency spectrum other than 200 KHz. In fact, the size of the spectrum represented by a frequency window 40 is application dependent. For example, in some embodiments, each frequency window 40 represents any frequency spectrum between 1 KHz and 200 KHz. In other words, the frequency window 40 has a spectral width anywhere between 1 KHz and 200 KHz. In some embodiments, each frequency window 40 represents any frequency spectrum between 200 KHz and 400 KHz. In still other embodiments, each frequency window 40 represents any frequency spectrum between 400 KHz and 800 KHz. However, in cases where the frequency band represented by radio signature 39 is the FM band, frequency windows 40 representing a frequency spectrum of 200 KHz is preferred.

In some embodiments, each frequency window 40 in radio signature 39 is uniform. That is, each frequency window 40 has the same spectral width (e.g., 200 KHz). In other embodiments, there is no requirement that each frequency window 40 in radio signature 39 have uniform spectral width. For example, in some embodiments, a radio signature 39 includes both AM and FM frequencies. In such embodiments, frequency windows 40 centered on AM frequencies will have one spectral width whereas frequency windows 40 centered on FM frequencies will have a second spectral width. For instance, in a preferred embodiment, the spectral width for frequency windows 40 in the FM band is 200 KHz whereas the spectral width for frequency windows 40 in the AM band is 10 kHz.

In preferred embodiments, the plurality of frequency windows 40 in a given radio signature 39 define a contiguous spectral region (e.g., all or a portion of the FM band). In some embodiments, the plurality of frequency windows 40 in a given radio signature 39 define two noncontiguous spectral regions (e.g., all or a portion of the FM band plus all or a portion of the AM band). In preferred embodiments, each radio signature 39 in lookup table 38 has the same frequency windows 40 as radio signature 50 and optional radio signatures 60, thereby facilitating direct comparison of radio signatures. In preferred embodiments, each frequency window 40 uniquely represents a particular frequency spectrum. In less preferred embodiments, there is overlap in the frequency windows 40 of a radio signature 39. In some embodiments, there are between five (5) and ten thousand (10,000) frequency windows 40 in a radio signature 39. In more preferred embodiments, there are between ten and five hundred frequency windows 40 in a radio signature 39. In still more preferred embodiments there are between 50 and 500 frequency windows 40 in a radio signature 39.

Signal quality 42 is any measure of signal quality. Non-limiting examples of signal quality 42 includes a decibel rating and a voltage. In some embodiments, signal quality 42 is represented in binary form where a first binary value represents a signal quality 42 greater than some predetermined threshold value and a second binary value represents a signal quality 42 that is less than some predetermined threshold value.

In some embodiments, there are between five and one million radio signatures 39 in radio signature lookup table 38. In more preferred embodiments, there are between one hundred (100) and fifty thousand (50,000) radio signatures 39 in radio signature lookup table 38. In still more preferred embodiments, there are between five hundred and twenty-five thousand radio signatures 39 in radio signature lookup table 38. In some embodiments, each radio signature 39 corresponds to a unique global position (geographical position) 62 in the United States, Canada, and/or Mexico. In some embodiments, each radio signature 39 corresponds to a unique global position in any combination of countries in the world.

In some embodiments, there are more than one radio signatures 39 corresponding to the same unique global position 62 in lookup table. Certain embodiments include more than one radio signature for a given global position to account for different conditions (e.g., night time and day time, etc.).

In some embodiments, each frequency window includes more than just one signal quality 42 attribute. For example, a generic RDS radio receiver can yield the following output:

FM Frequency (e.g., float 87.5 to 108.0) MHz
RDS Quality (e.g., float 0.0000 to 5.0000) volts
FM Multipath (e.g., float 0.0000 to 5.0000) volts
FM Level (e.g., float 0.0000 to 5.0000) volts In such a device, any combination of RDS quality (e.g., 0 to 5 volts), FM multipath (e.g., 0 to 5 volts) and FM signal strength (FM level) (e.g., 0 to 5 volts) can be used as a metric to assess quality in a given frequency window 40. In some HD specific embodiments, atomic (GPS) time synchronized high density (HD) signal markers present in the HD signal can be used, when such signal markers become available.

Moreover, some devices that can serve as radio signal decoder 12 and microprocessor 14 can measure additional variables that are useful for establishing a metric that represents signal quality in a given frequency window 40 (e.g., phase lock). Thus, in some embodiments, signal quality 42 actually consists of measurements for several different variables (e.g., RDS quality, FM Mulipath, FM level, AM level, phase lock). In some embodiments, each of these variables are combined to form a single representation of signal quality for a given frequency window 40. In other embodiments, each of these variables independently serves as a unique representation of signal quality. In such embodiments, signal quality 42 for a given frequency window 40 is multidimensional.

In some embodiments, radio signature comparison module 32 determines the global position 62 of radio 10 at a given point in time and radio display module 34 (which may be a subset of radio signature comparison module 32) displays this global position 62 on display 16. In some optional embodiments, radio display module 34 uses the newly determined global position 62 to see if there is any information for the position 62 stored in optional radio display table 70. Radio display table 70 includes records 72 for a plurality of global positions. If radio display module 34 finds a match between the newly identified global position 62 and a record 72 (i.e., the record 72 corresponds to the global position 62), then module 34 displays record 72 on display 16. In some embodiments, record 72 provides traffic or weather information for the global position corresponding to record 72. In some embodiments, record 72 provides a detailed street map for the global position corresponding to record 72. Radio display table 70 is updated by table update module 36 using information provided by radio waves decoded by radio signal decoder 12. Such updates can include, for example, updated traffic information and/or updated weather information for specific global positions.

5.2 Exemplary Data Structures

Figure 1B:
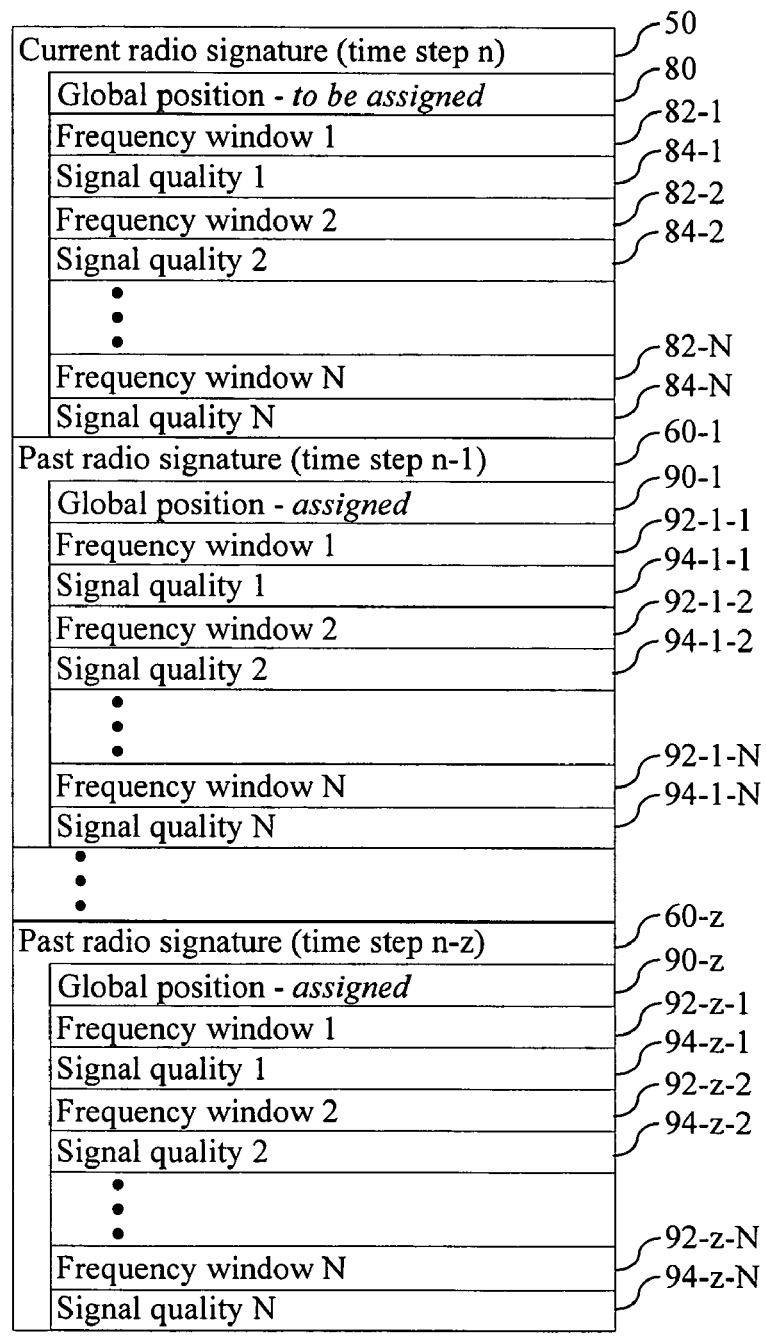
FIG. 1B illustrates data structures that are measured by a radio receiver capable of determining geographical position in accordance with an embodiment of the present invention.

Referring to FIG. 1B, as a result of measurements obtained by radio signal decoder 12, elements of a current radio signature 50 data structure are populated. That is, for each of a plurality of frequency windows 82, one or more signal quality parameters 84 are determined. As in the case of signal quality parameters 42 of FIG. 1A, there may be more than one signal parameter for each frequency window 82 and the signal quality may represent a maximum value for a given frequency window. In preferred embodiments there is a one to one correspondence between respective frequency windows 82 of FIG. 1B and frequency windows 40 of FIG. 1A. In other words, for each respective frequency window 82 of radio signature 50, there is a corresponding frequency window 40 that represents the same frequency spectrum as the respective frequency window 82.

5.3 Exemplary Method for Localizing a Radio Receiver

Now that an overview of a radio receiver 10 in accordance with one embodiment of the present invention has been described with reference to FIG. 1, a method of using the radio receiver 10 to identify the global position of the radio receiver in accordance with one embodiment will be described in conjunction with FIG. 2.

Step 202. In step 202, a determination is made of the current radio signature 50. This is accomplished by scanning a predetermined range of frequencies. As discussed above, the present invention envisions a broad spectrum of different possible predetermined frequency ranges. However, in a preferred embodiment, the predetermined range of frequencies is the FM band. The predetermined range of frequencies is divided into a plurality of predetermined frequency windows 82 that collectively represent the predetermined range of frequencies. For each frequency window 82 in the predetermined range of frequencies, a signal quality is measured and saved as the corresponding signal quality 84 for the frequency window. In some embodiments, this signal quality represents the maximum field/signal strength measured in the frequency window. For example, in some embodiments, radio signal decoder 12 is a generic programable RDS radio module that reports FM signal quality as an analog value within a voltage range (e.g., 0 to 5 volts). In some embodiments, metrics in addition to or instead of FM signal quality are used to assess a given frequency window 82. For example, in some embodiments an FM multipath signal is measured in addition to FM signal quality. In some embodiments an RDS quality is measured in addition to FM signal quality. For example, a generic RDS radio receiver can report the RDS signal quality as analog values in a predefined voltage range (e.g., 0 to 5) volts. In other embodiments, phase lock and other statistical information provided by radio signal decoder 12 are recorded for each radio signature 39 in step 202. For those variables that vary as a function of frequency, the variables are recorded for each frequency window 82. For those variables that do not vary as a function of frequency, a signal measurement of such variables is recorded for the radio signature 39.

In some embodiments, for each frequency in the predetermined range of frequencies, the parameter of interest (e.g., FM radio signal strength) is measured several different times. For each measurement, the value assigned to the parameter of interest at the given frequency is the average, median, or mean of the individual values measured for the parameter of interest at the given frequency. In some embodiments, such measurements are performed in a sweep. For example, in some embodiments, the predetermined range of frequencies is measured in a sweep. The sweep begins at one end of the predetermined range of frequencies and finishes at the other end of the predetermined range. Measurements of the parameters needed to asses signal quality are performed at each frequency in the predetermined range of frequencies. For example, in some embodiments, the predetermined range of frequencies is the entire FM band.

Step 202 begins at one end of the band (e.g., 88.0 MHz) and takes samples at that frequency for a period of time, moves to the next frequency in the band (e.g., 88.2 MHz) and takes samples at that frequency for a period of time, and so forth. In some embodiments, the period of time spent at each frequency (or frequency window 82) is one second. In some embodiments, the period of time spent at each frequency (or frequency window 82) is less than 1 second, less than 0.5 seconds, or less than 100 milliseconds. In still other embodiments, the period of time spent at each frequency (or frequency window 82) is more than 1 second, more than 2 seconds, or more than 5 seconds). In some embodiments, 1000 samples of the parameter of interest are taken per second. Thus, in an embodiment in which the period of time spend at each frequency (or frequency window 40) is 1 second, 1000 samples (measurements) are taken of the parameter of interest per second. In some embodiments, more than one parameter is measured simultaneously. In many instances, the capabilities of the radio signal decoder 12 will dictate whether or not parameters can be concurrently sampled, which parameters can be sampled, and how frequently such parameters can be sampled. However, at a minimal level, a parameter that is indicative of signal strength is measured at each frequency or frequency window. In some embodiments, between 10 and 10,000 samples per second are taken of a parameter of interest during a sweep. In more preferred embodiments, between 100 and 5,000 samples per second are taken of a parameter of interest during a sweep.

In some embodiments, successive instances of step 202 are performed at timed intervals. For example, step 202 is performed every second, every minute, half hour, or some longer interval. When step 202 is repeated, the values for current radio signature may change subject to new measurements from radio signal decoder 12. Referring to FIG. 1B, in some embodiments, the current radio signature 50 is saved as a past radio signature 60 prior to saving new values for current radio signature 50. Past radio signatures 60 may or may not have a global position 90 assigned to them. However, in all instances past radio signatures 60 have frequency windows 92 that exactly correspond to frequency windows 82 of current radio signature 50. Thus, to save a current radio signature 50 as a past radio signature 60, signal quality values 84 are simply mapped onto and saved to the corresponding signal quality value 94 fields.

Step 204. Close to a transmitter, it is often the case that the observed signal strength of the transmitter appears to be saturated. For example, consider the case in which a radio receiver reports an FM quality value in the range of 0 to 5 volts. Thus, when receiver reports an FM quality value of five volts for a given FM frequency, the frequency window that bounds the measured frequency is flagged as saturated and is not used in subsequent comparisons. While not intending to be limited to any particular theory, the perceived saturation is likely due to limitations in presently available radio signal decoders 12. While this perceived saturation has no adverse affect on measured signature 50, little information about the noise characteristics of the signal can be gleaned at close distances to a transmitter. Thus, in some embodiments, only non-saturated values from step 202 are considered. In such embodiments, frequency windows 82 in which a signal quality is saturated are removed from the radio signature. For example, in some embodiments, this removal process entails designating the saturated frequency window 82 for nonuse. Frequency windows 82 that are designated for nonuse are not compared to corresponding frequency windows 40 in radio signature lookup table 38 in subsequent processing steps.

Step 206. It has been observed that, for some radio signal decoders 12, the signal quality value never falls to the lowest possible value in the range of allowed values. In particular, it has been observed that even at frequencies at which there is no transmitter, a radio signal decoder 12 outputs a basal radio signal quality voltage rather than outputting a reading of 0 volts. While not intending to be limited to any particular theory, it is believed that this basal voltage is caused by a DC offset in the radio signal decoder 12. While such receiver limitations have no known adverse affects on measured signature 50, they do not contribute to the global position determination. Therefore, in some embodiments, the current radio signature 50 is normalized by removing the offset from each signal quality measurement 84 in radio signature 50. The purpose of such normalization is to improve the stability of subsequent comparison methods. In one embodiment, signal quality 84 is FM quality and normalization 206 involves the removal of an offset that appears in the FM quality signal.

In some embodiments, normalization 206 comprises amplifying measured signal quality values to increase separation between data peaks in the radio signature 50. Such amplification can be accomplished by multiplying each signal quality 94 by a constant in embodiments in which there is only a one signal quality 94 parameter measured per frequency window 92 (e.g., multiplication of signal strength by a constant). While this has the effect of amplifying noise in addition to true signals, it has been found that such amplification increases the stability of the comparison method by reducing its required sensitivity.

Methods for obtaining a current radio signature 50 have been provided. It will be appreciated that the methods by which current radio signature 50 were obtained can be used to measure each of the radio signatures 39, typically at some time prior to execution of steps 202 through 206. Such measurements are typically made by a radio receiver that is coupled with a GPS system as described in the exemplary systems below and/or some other mechanism for determining global position. The radio receiver used to make the measurements for radio signature 39 can be the same radio receiver used to make the measurements for radio signature 50. However, in more typical embodiments, different radio receivers are used. Each radio signature 39 can be processed to exclude saturated frequencies and to normalize to remove any form of basal voltage in the same manner in which radio signature 50 is optionally processed in steps 204 and 206.

Step 208. In most instances, a comparison of the current measured radio signature 50 to signatures 38 in lookup table 38 is sufficient to uniquely identify the global position of radio receiver 10. However, past radio signatures 60 can be used to break any ties that may arise. For example, consider the case in which radio receiver 10 is in a car heading North along a highway. At time point one, a current radio signature 50 is measured. Comparison of current radio signature 50 to each radio signature 39 in lookup table 38 identifies a clear best match, say radio signature 39-1. Now, at point two, current radio signature 50 is again measured. However, comparison of current radio signature 50 to each radio signature 39 in lookup table 38 identifies two radio signatures 39 that match the new current radio signature 50. To break the tie, the radio signature 39 in the set of two matching radio signature 39 that is geographically proximate to the most recent past radio signature (e.g., radio signature 60-1 FIG. 1B) is selected. Selection of the geographically proximate radio signature is selected on the premise that radio receiver 10 could not have traversed too far between time step 1 and time step 2. This example illustrates the use of a single past radio signature 60. However, in practice, any number of past radio signatures can be used to break ties.

Step 210. Once a current radio signature 50 has been measured and optionally processed (e.g., saturated values removed and the signature normalized), signature 50 is compared to one or more radio signatures 39 in radio signature lookup table 38.

In some embodiments, a brute force approach is applied in which a comparison score is generated for each such comparison. In some embodiments this comparison score is simply an indication as to whether the two signatures match. In one embodiment, a declining threshold method is used. In the declining threshold method, the frequency window 82 with the strongest signal quality 84 is first considered. Only those respective radio signatures 39 that have a measured signal in the corresponding frequency window 40 that is stronger than the measured signal in any other frequency window of the respective radio signature 39 are considered. For example, consider the case in which a current radio signature 50 includes a measured signal at frequencies 96.7, 98.5, and 100.3 and that the signal for 96.7 is the strongest. Only those respective radio signatures 39 that include a signal for 96.7 (or the frequency window 40 that encompasses this signal) that is larger than any other signal in the respective signature 39 are considered candidates. If this comparison does not limit the candidate signatures 39 to a single candidate signature, then the second strongest signal in current radio signature 50 is considered and so forth until a single candidate signature 39 is identified. Comparison of just a single frequency in many instances is a powerful indicator of the geographical location of radio signature measurement model 30. Review of FM transmitter reference sources registered with the Federal Communications Commission (FCC) in the United States and the Canadian Radio-television and Telecommunications Commission (CRTC) in Canada reveals that there are relatively low upper bounds on the number of transmitters for each FM frequency in Canada and the United States. That is, based on a single frequency, the location of the receiver can be determined to within less than 200 (maximum) locations within all of Canada and the United States. Therefore, comparison of two, three or four different frequencies using the above identified declining threshold method is, in most instances, sufficient to identify a single matching radio signature 39 in radio signature lookup table 38.

In some embodiments, the signal strength of at least one frequency is used to assign current radio signature 50 a global location using the systems and methods of the present invention. In more preferred embodiments, the signal strengths of two or more frequencies are used to assign current radio signature 50 a global location. In some embodiments, between two and ten frequencies are used to assign current radio signature 50 a global location. In some embodiments, between three and twenty frequencies are used to assign current radio signature 50 a global location. In any of these embodiments, one or more additional signal quality parameters is optionally used to facilitate the assignment of a global location to current radio signature 50.

In some embodiments, rather than the declining threshold method, a "decision tree" approach is used to identify a match in signature lookup table 38. In some embodiments of the "decision tree" approach, the most powerful signals (frequencies or corresponding frequency windows) in current radio signature 50 are matched against candidate radio signatures 39 in signature lookup table 38. Then candidate radio signatures 39 are assessed based on the likeliness that such candidates represent the correct location. For example, in cases where past radio signatures 60 with assigned global positions 90 are available, candidate radio signatures 39 having global positions 62 that are proximate to assigned global positions 90 are given more weight than distal signatures 39. This process continues until a single geo-polygon target (radio signature 39) is reached with the highest probability as the solution. In some embodiments, other parameters in addition to signal strength are used in the "decision tree" approach. For example, in some embodiments, signal strength in addition to available information about RDS signal quality is used. In fact, any combination of signal quality 42 metrics that are stored in memory 20 can be used.

In some embodiments, the signal quality metrics 84 measured in the current radio signature are reduced to a searchable expression. For example, consider the case in which current radio signature 50 includes a measured signal at frequencies 96.7, 98.5, and 100.3. This can be represented as an array that is zero everywhere except for the three values in the array that represent frequencies 96.7, 98.5, and 100.3. In alternative embodiments, the three values respectively representing frequencies 96.7, 98.5, and 100.3 can be binary (e.g., be assigned the value "1"). In such embodiments, the array can be represented as:

| 96.8 | 97.0 | 97.2 | ... | 98.4 | 98.6 | ... | 100.4 |
|------|------|------|-----|------|------|-----|-------|
| 1    | 0    | 0    |     | 0    | 1    |     | 1     |

In this array, frequencies are assigned to frequency windows. For example, the number 96.8 in the first row of the array represents the frequency window spanning 96.6 to 96.8. Thus, 96.7 is placed in this frequency window and assigned a value of "1." In some embodiments, rather than assigning a first binary value (e.g., "1") when a signal is observed, a value representative of signal strength is provided (e.g., a real value between 0 and 5). Thus, for example, in the case where 3.7 volts is measured for frequency 96.7, 4.2 volts is measured for frequency 98.5, and 2.4 volts is measured for frequency 100.3, the array can be represented as:

| 96.8 | 97.0 | 97.2 | ... | 98.4 | 98.6 | ... | 100.4 |
|------|------|------|-----|------|------|-----|-------|
| 3.7  | 0    | 0    |     | 0    | 4.2  |     | 2.4   |

In embodiments in which a real value is assigned, error tolerances can be added. For example, consider the case in which the signal strength for frequency 96.7 is 3.7 volts. An error value of, for example, ±0.2 volts can be applied to the signal strength. Thus, in an embodiment where an error value of ±0.2 volts is applied, the array can be represented as

| 96.8 | 97.0 | 97.2 | ... | 98.4 | 98.6 | ... | 100.4 |
|------|------|------|-----|------|------|-----|-------|
| 3.7 ± 0.2 | 0 | 0 | | 0 | 4.2 ± 0.2 | | 2.4 ± 0.2 |

In principle, in embodiments in which error bars are provided, the present invention encompasses a broad range of possible error bars. An example where a constant error is applied to all measured signals has been illustrated above. In other examples, the error bar for each measured signal is a function of the magnitude of the measured signal. For example, consider the case where an error of ten percent is allowed. In such an embodiment, the array can be represented as:

| 96.8 | 97.0 | 97.2 | ... | 98.4 | 98.6 | ... | 100.4 |
|------|------|------|-----|------|------|-----|-------|
| 3.7 ± 0.4 | 0 | 0 | | 0 | 4.2 ± 0.4 | | 2.4 ± 0.2 |

Upon review of the above disclosure, those of skill in relevant arts will appreciate that there are many different error schemes that could be applied in order to represent the signal quality of a current radio signature 50 and all such schemes are within the scope of the present invention. In practice, some calibration of the error algorithm is needed in order to achieve a sufficient probability that there is only one radio signature 39 in radio signature lookup table 38 that matches a given current radio signature 50.

In some embodiments, more than one type of signal quality metric 84 can be found in the current radio signature 50 besides signal strength as a function of signal frequency. In general, such additional signal quality metrics 84 can be divided into two categories: (i) those that have been measured as a function of frequency (e.g. RDS signal quality) and (ii) those in which only a single value is measured for the entire frequency spectrum under consideration. Each metric in the former class of additional signal quality metrics can be assigned an additional row in the arrays illustrated above whereas each metric in the latter class of additional signal quality metrics can simply be added as another column to the arrays described above.

The signal quality metrics 42 of radio signatures 39 can be represented in an array format just like the signal quality metrics 84 of current radio signature 50. In fact, in some embodiments, error bars are applied to signal qualities 42 (the reference signal qualities of FIG. 1A) rather than signal qualities 84 (the measured signal qualities of FIG. 1B). This is because the reference signal qualities can be measured at a given global position 62 using more sensitive equipment, different types of equipment (e.g., different antenna configurations) or under various different conditions (time of day, time of year, weather, etc.) in order to obtain a realistic determination in the variance in signal quality 42 across such conditions. This variance can then be formulated into specific error values for each signal quality value. As an example, consider the case in which frequencies 96.7, 98.5, and 100.3 are measured at a given global position 62. In constructing a radio signature 39 for this global position 62, frequencies 96.7, 98.5, and 100.3 can be measured at global position 62 at different times of day, under different weather conditions, with different radio signal decoders 12 and/or different antenna configurations. Suppose that when this is done, it is found that the signal strength for frequency 96.7 has a signal strength of 3.0±0.4 volts whereas the signal strength for frequency 98.5 has a signal strength of 3.0±0.001 volt. In this case, frequency 96.7 will be assigned a much larger error bar in the corresponding radio signature 39 than frequency 98.5.

The arrays described above can then be compared using any of a wide range of comparison techniques. For example, the strongest signals in current radio signature 50 can be compared first in the declining threshold or decision tree approaches, etc. However, the representation of current radio signature 50 in the array format shown above (and the description of radio signature 39 having the same format) is meant to aid in the visualization of what data is used to identify a matching radio signature 39 in radio signature lookup table 38. In practice, it is not necessary to represent signal quality metrics 84 (or signal quality metrics 42) in the array format described above in order to find matching radio signatures 39.

In some embodiments, enough quality metrics are used and radio signature lookup table 38 is sufficiently populated with radio signatures 39 to ensure that radio receiver 10 is localized to a specific global position. In some embodiments in which this is the case, radio signature lookup table 38 is arranged as a tree. For example, in some embodiments, radio signatures 39 are organized into a tree in which parent nodes representing certain radio signatures 39 point to daughter nodes representing radio signatures 39 that are geographically proximate to the signatures represented by parent nodes and/or have a signature that is similar to the signatures represented by parent nodes. There are several trees data structures known in the art and any such tree data structure can be used to organize radio signature lookup table 38. Representative examples include, but are not limited to, binary trees, red-black trees, splay trees, and B-trees. See, for example, Binstock and Rex, 1995, *Practical Algorithms for Programmers*, pp. 245-231, Addison Wesley, Reading Mass.; Adel'son-Vel'skii and Landis, 1962, "An algorithm for the Organization of Information," Soviet Math 3, pp. 1259-1263; Bayer and McCreight, 1972, "Organization and Maintenance of Large Ordered Indexes," Acta Informatica 1, pp. 173-189; Comer, 1979, "The Ubiquitous B-tree," *Computing Surveys*, Vol. II, pp. 121-137; Knuth, 1973, *the Art of Computer Programming, Vol. 3: Sorting and Searching*, Addison Wesley, Reading Mass.; Melhorn, 1984, *Data Structures and Algorithms I: Sorting and Searching*, Springer-Verlag, Berlin, Germany; Sleator and Tarjan, 1985, "Self-Adjusting Binary Search Trees," Journal ACM 32, pp. 652-686; Tarjan and Van Wyk, 1988, "An O(n log log n)-Time Algorithm for Triangulating a Simple Polygon," Siam J. Comput 17, pp. 143-178, each of which is hereby incorporated by reference in its entirety.

In some embodiments in which enough quality metrics are used and radio signature lookup table 38 is sufficiently populated with radio signatures 39 to ensure that radio receiver 10 is localized to a specific global position, radio signature lookup table 38 is encoded as a hash table. In such embodiments the quality metrics (quality metrics 42 in the case of radio signatures 39; quality metrics 84 in the case of measured radio signature 50) are used as input to a common hash function. In such embodiments, a search for a match between measured ratio signature 50 and a radio signature 39 is implemented as a hash table lookup. Hashing is a well known algorithm. For exemplary hashing techniques that can be used in accordance with the present invention see, for example, Binstock and Rex, 1995, *Practical Algorithms for Programmers*, pp. 63-93, Addison Wesley, Reading Mass.; Aho et al., 1986, *Compilers: Principles, Techniques, and Tools*, Addison-Wesley, Reading, Mass.; Holub, 1990, *Compiler Design in C*, Prentice Hall, Englewood Cliffs, N.J.; Kruse et al.; 1991, *Data Structures and Program Design in C*, Prentice Hall, New Jersey; and UNIX Press, 1990, *System V Application Binary Interface—Unix System*, Prentice Hall, Englewood Cliffs, N.J., each of which is hereby incorporated by reference in its entirety.

Step 212. In step 212, a global position 80 is assigned to radio receiver 10 based on the respective radio signature 39 in radio signature lookup table 38 that best matches current radio signature 50 as determined by step 210. In cases where a plurality of hits (plurality of candidate radio signatures 39) are found in step 210 rather than a unique match, previously measured radio signatures 60 can be used to identify the appropriate radio signature among the candidates. For instance, those candidate radio signature that represent global positions most proximate to the global positions identified for previously measured radio signatures 60 can be upweighted.

In some embodiments global position 80 is localized in step 212 to a geometric polygon that encompasses 50 contiguous square miles or less. In more preferred embodiments, global position 80 is localized in step 212 to a geometric polygon that encompasses 5 contiguous square miles or less. In still more preferred embodiments, global position 80 is localized in step 212 to a geometric polygon that encompasses 1 contiguous square mile or less. In still more preferred embodiments, global position 80 is localized in step 212 to a geometric polygon that encompasses 0.5 contiguous square miles or less. In still more preferred embodiments, global position 80 is localized in step 212 to a geometric polygon that encompasses five contiguous acres or less. In still more preferred embodiments, global position 80 is localized in step 212 to a geometric polygon that encompasses one acre or less. In some embodiments, global position 80 is localized in step 212 to within twenty-five, twenty, ten, or five contiguous city blocks of the actual location of radio receiver 10.

In some embodiments, a comparison of the global position 80 identified in step 212 to the global positions 90 assigned in past radio signatures 60 is used to determine whether radio receiver 10 is moving and, if so, the direction radio receiver 10 is moving. For example, consider the case in which step 212 determines that radio receiver is at global position 1. And past radio signature 60-1 reports a global position 2. Suppose that position 2 is directly South of position 1. This indicates that between the current measurement and the last measurement, radio receiver 10 has moved directly North. In some embodiments, the current radio signature 50 is polled sufficiently frequently and global positions assigned to the radio signatures are sufficiently precise to establish not only the direction that radio receiver 10 is traveling, but also the speed at which the receiver is traveling.

Step 214. In typical embodiments, steps 202-212 are performed by radio signature comparison module 32. As such, by the time step 214 is reached, an accurate determination of the global position of radio receiver 10 has been accomplished without any need for a conventional satellite global positioning feed. All that is needed is a program radio signal decoder 12 and programmable circuitry that can search a radio signal lookup table 38 for matching radio signatures 39. Furthermore, in some embodiments, the direction and even the speed at which radio receiver 10 is moving can be determined.

In step 214, the information obtained using the novel methods of the present invention is used for any of a number of purposes. For example, in some embodiments, newly assigned global position 80 is displayed on display 16. In some embodiments, processing step 214 is accomplished by radio display module 34. In some embodiments, radio display module 34 and radio signature comparison module are part of a common software module.

In some embodiments, step 214 comprises using newly assigned global position 80 to perform a table lookup in optional radio display table 70. Radio display table 70 includes data records 72 for select global positions. To illustrate, consider the case in which global position 80 is geographic position 1012. In step 214, a determination is made as to whether radio display table 70 includes a record 72 for geographical position 1012. When this is the case, radio display module 34 optionally displays all or a portion of the contents of the corresponding record on display 16. In some embodiments information 72 includes information not only for display 16 but also audible information, such as an alarm, a sound, an audible message, audible instructions, a song, etc. In such instances, the audible information is sounded using the amplification system (not shown) of radio receiver 10.

In some embodiments, information 72 is updated by table update module 36 on a regular or irregular basis using information received by radio signal decoder 10. For example, in some embodiments radio signal decoder 10 receives a Radio Data System (RDS) or high definition (HD) signal that carries geographic specific traffic, weather, or general news updates. Table update module 36 parses this information into appropriate records 72. Then, in step 214, this information is displayed on display 16 and/or audibly sounded.

5.4 Specific Comparison Method

Figure 2:
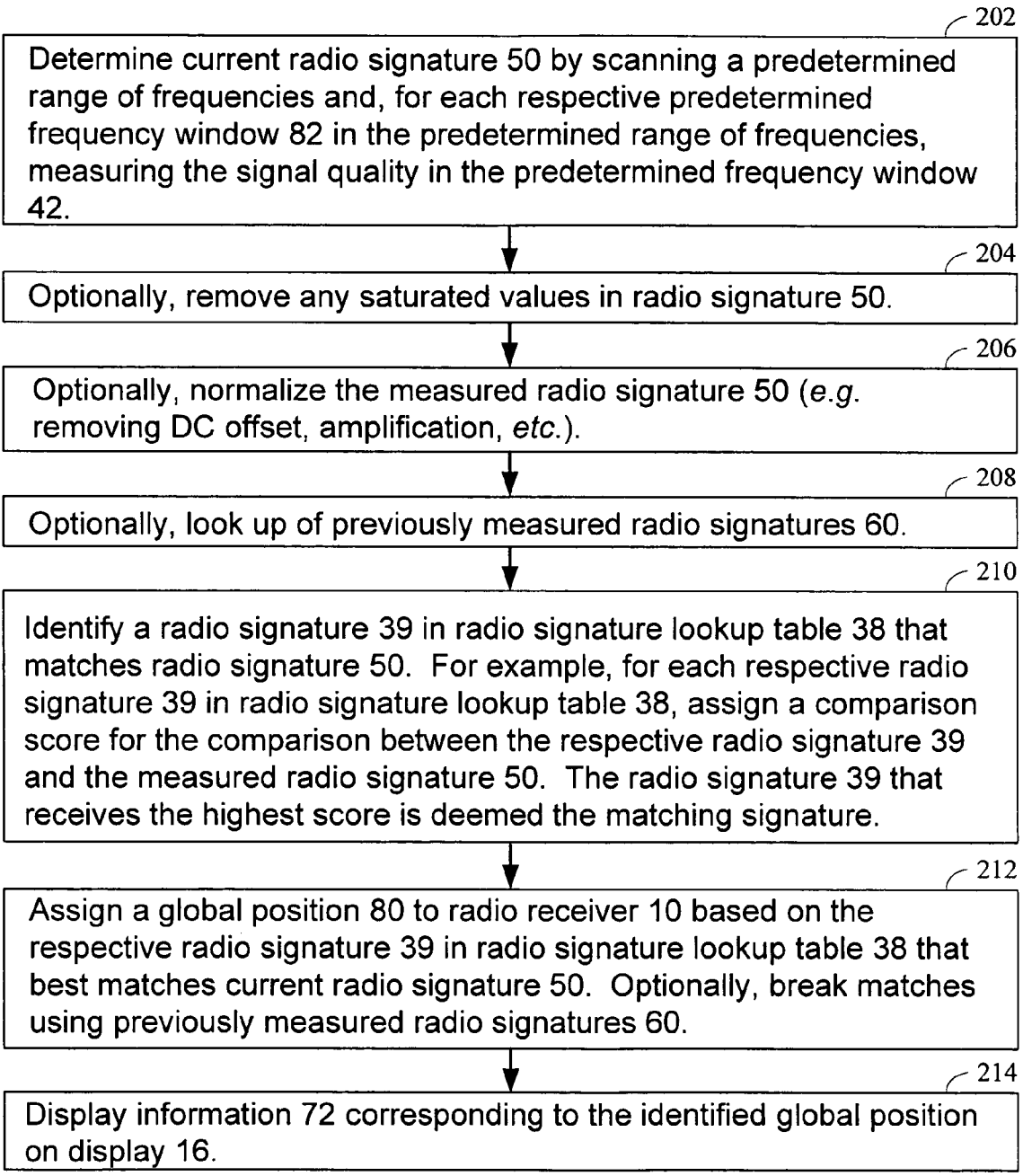
FIG. 2 illustrates a method for determining geographic position in accordance with an embodiment of the present invention.
Figure 3:
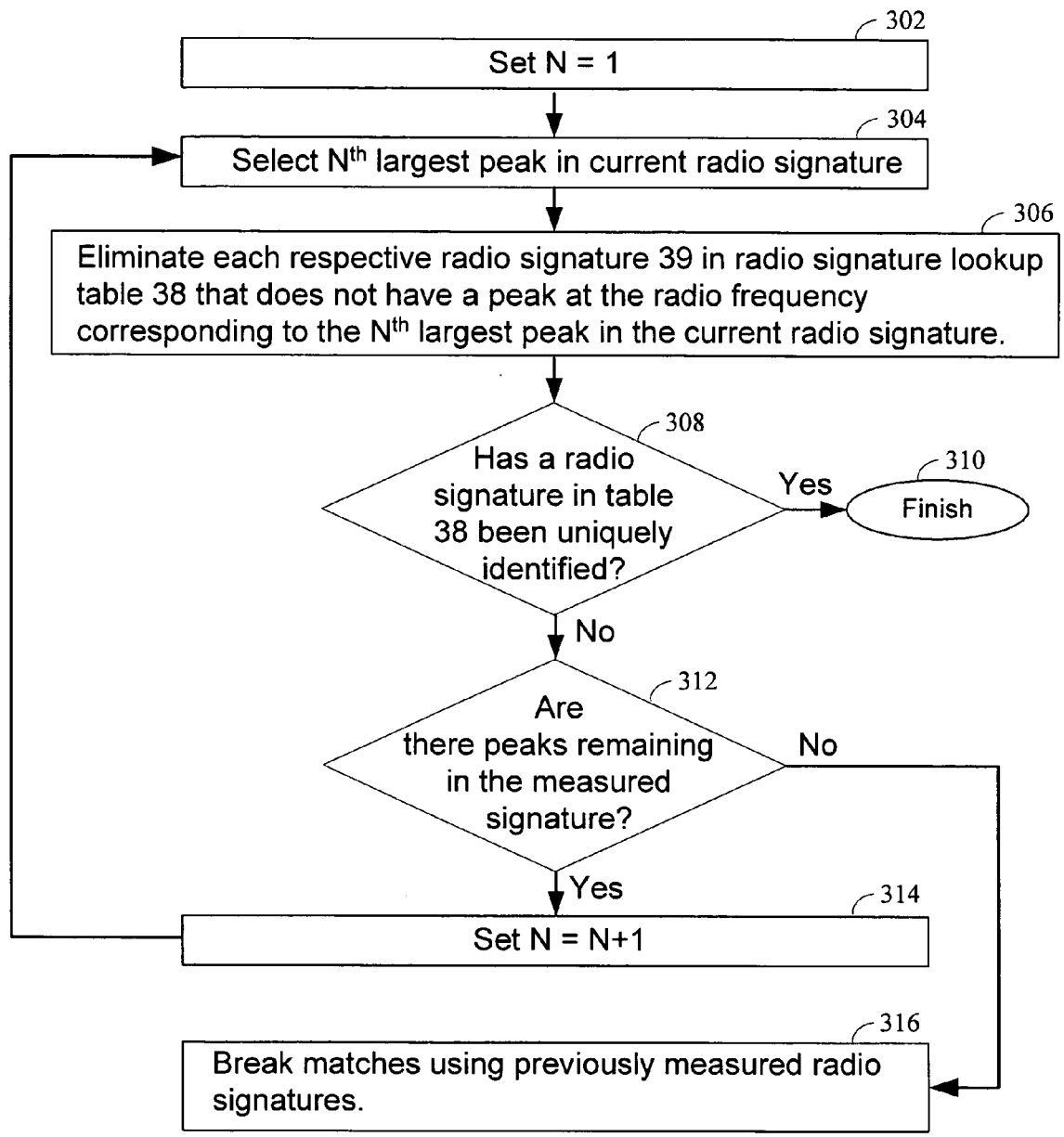
FIG. 3 illustrates a method for assigning a global position to a current radio signature in accordance with an embodiment of the present invention.

An overview of systems and methods for pinpointing the geographic position of a radio receiver using radio signals has been provided in conjunction with FIGS. 1 and 2. Central to such systems and methods is a process for matching signal quality metrics 84 of a current radio signature 50 to signal quality metrics 42 of a plurality of radio signatures 39. This comparison is embodied as step 210 in FIG. 2. FIG. 3 shows one detailed way of implementing step 210 of FIG. 2.

Step 302. In step 302, a variable N is set to one.

Step 304. In step 304, the $N^{th}$ largest signal 84 in current radio signature 50 is selected.

Step 306. In step 306, radio signature 50 is compared to radio signatures 39 in radio signature lookup table 38. Radio signatures 39 are eliminated from further consideration if they do not have a signal 42 at the same frequency (or frequency window) as the frequency of the $N^{th}$ largest signal selected in step 304. Moreover, in some embodiments, radio signatures 39 are eliminated from further consideration if they do not have a corresponding signal 42 with the same relative magnitude as the $N^{th}$ largest signal 84 selected in step 304. To illustrate, consider the case in which the $N^{th}$ largest signal 84 selected in step 304 has a frequency of 96.7. Each respective radio signatures 39 that does not have a frequency window 40 encompassing the frequency 96.7 in which the corresponding signal quality 42 is higher than the signal quality 42 of any other frequency window 40 in the respective radio signature 39 is eliminated from further consideration.

Step 308. In step 380 a determination is made as to whether elimination step 306 has eliminated so many radio signatures 39 from consideration that there is now only one possible signature 39 remaining in lookup table 38. When such a determination is affirmative (308-Yes), process control passes to step 310. When such a determination is not affirmative (308-No), process control passes on to step 312.

Step 310. Step 310 is reached if a unique radio signature 39 has been identified as matching current radio signature 50. In such instances, global position 80 is assigned the value of the global position 62 of the matching unique radio signature 39 and the process is terminated.

Step 312. Step 312 is reached when a unique radio signature 39 has not been identified. In step 312, a determination is made as to whether there are remaining peaks (frequencies) in current radio signature 50. If so, process control passes to step 314. If no peaks in current radio signature 50 remain, process control either terminates unsuccessfully (not shown) or passes on to step 316.

Step 314. In step 314 counter N is incremented by "1", indicating that the next most significant peak in radio signature 50 is to be selected for evaluation. Then, process control returns to step 304 where the $N^{th}$ largest peak in current radio signature 50 is selected for evaluation. Process control then proceeds once again to step 306. In step 306 those radio signatures 39 that do not have the $N^{th}$ largest peak registered as the $N^{th}$ largest peak are eliminated. To illustrate, consider the case in which the $N^{th}$ largest signal 84 selected in the first instance of step 304 has a frequency of 96.7. Each respective radio signatures 39 that does not have a frequency window 40 encompassing the frequency 96.7 in which the corresponding signal quality 42 is higher than the signal quality 42 of any other frequency window 40 in the respective radio signature 39 is eliminated from further consideration. However, this was not sufficient to uniquely match a radio signature 39 to radio signature 50. Suppose that five radio signatures 39 in radio signature lookup table 38 remained after the first instance of elimination process 306. Thus, a second instance of step 304 is run in which the second largest peak is selected. Suppose that the second largest frequency is 98.5. In the second instance of elimination process 306, each respective radio signatures 39 in the set of five remaining radio signature 39 that do not have a frequency window 40 encompassing the frequency 98.5 in which the corresponding signal quality 42 is the second highest signal quality 42 in the respective radio signature 39 is eliminated from further consideration. The loop defined by processing steps 304 through 314 continues until there is only a single radio signature remaining or there are no further peaks in radio signature 50 to analyze.

Step 316. In some embodiments, the geographic positions assigned to past radio signatures 60 are used to help eliminate candidate radio signatures 39. For instance, if there are two candidate radio signatures 39 remaining and one of the two signatures is proximate to the geographic positions assigned to past radio signatures 60 and the other is not, the proximate signature 39 is selected and the other signature is eliminated.

5.5 Population of Radio Signature Lookup Table 38

The present invention uses efficient, reliable means for populating radio signature lookup table 38. Such techniques can be classified into three types of models (i) fully predictive, (ii) fully empirical ("brute-force"), and (iii) empirical-predictive hybrid. As waves travel from a transmit antenna to a receive antenna, they suffer attenuation due to propagation loss. Fully predictive models predict signal strengths based on known transmitter locations and attenuation models. In contrast, fully empirical models rely on reference measurements of signal strengths taken from known reference locations throughout a supported geographic region. In the empirical-predictive hybrid approach, empirical data is used to verify and/or calibrate a predictive model.

5.5.1 Fully predictive models. Radio propagation in land mobile environments is subjected to degradation due to the combination of three main effects: (i) large scale path loss (area mean variation), (ii) large scale shadowing (local mean variation), (iii) and small scale multi-path fading (instantaneous variation).

The large scale path loss, or area mean variation, is caused by signal attenuation due to the distance between transmitter and receiver and its variation follows the inverse of the $n^{th}$ power of this distance, where n is commonly referred to as the path loss exponent. The value of n typically lies between 2 and 5. A value of 2 refers to free space propagation in which the variation of the received signal follows the Friis formula. See de P. Rolim, Telecomunicacoes 4, Dec. 2001, pp. 51-55; and Rappaport, "Wireless Communications—Principles and Practice," IEEE Press, Inc., New York and Prentice Hall, Inc., New Jersey, 1996, each of which is incorporated by reference in its entirety. A value greater than 2 indicates the influence of structures on the earth surface. Dense urban environments always have values of n on the order of 4 or even 5. Suburban ones have n ranging from 2 to 4.

Large scale shadowing is caused by the terrain contour and other obstructions between the transmitter and receiver, in the local sense. It corresponds to variations about the area mean value and typically follows a log-normal probability density independent of the distance between transmitter and receiver.

Small scale multi-path fading has to do with the fact that signals received by a mobile terminal come from an infinitely large number of propagation paths. These multiple propagation paths are caused by reflection, diffraction and/or scattering of the radio wave in natural structures (hills, vegetation, etc.) and in human-made structures (buildings, poles, etc.). The composite signal at the receiver antenna suffers magnitude and phase variations due to the multiple propagation paths that interfere with each other constructively and destructively, depending on the spatial position of the receiver. These variations are termed multi-path fading and they occur at a rate that depends directly on the speed of motion of the receiver and/or of the objects around the receiver.

Thus, propagation mechanisms are very complex and diverse. First, because of the separation between the receiver and the transmitter, attenuation of the signal strength occurs. In addition, the signal propagates by means of complex phenomena such as diffraction, scattering, reflection, transmission, refraction, etc. A propagation model is a set of mathematical expressions, diagrams, and algorithms used to represent the radio characteristics of a given environment. In the present invention, they are used to generate geopolygons (radio signatures 39) based on the intersections of transmitter broadcast areas and compensates for signal attenuation that arises, inter alai, as a result of one or more of the factors discussed above. Table 1 provides exemplary propagation models that can be used to facilitate such calculations. However, it will be appreciated that the present invention is not limited to the use of these models.

TABLE 1

Exemplary propagation models used to calculate signal quality 42 for radio signatures 39.

| Propagation Model | Operating Frequency (MHz) | Range (km) | Terrain Elevation | Terrain Type |
|---|---|---|---|---|
| Free Space | Unlimited | Unlimited | Not applicable | Not applicable |
| Rec. ITU-R P.370-7 | 30-250 450-1000 | 0-1000 | Yes | Some |
| Rec. ITU-R P.1146 | 1000-3000 | 0-500 | Yes | Some |
| Okumura Hata | 150-1500 | 0-20 | Not applicable | Some |
| CRC-PREDICT v.2.07 | 30-3000 | Unlimited | Yes | Yes |
| CRC-PREDICT v.2.08r2 | 30-3000 | Unlimited | Yes | Yes |
| CRC-PREDICT v.3.21 | 30-3000 | Unlimited | Yes | Yes |
| Longley Rice | 20-20000 | 1-2000 | Yes | No |
| TIREM | 20-20000 | Unlimited | Yes | No |
| Egli | Unlimited | Unlimited | Not applicable | Not applicable |

While most of these models can provide a fairly accurate representation of the desired geographic discretization, more accurate propagation models lead to more accurate signal quality parameters 42 in table update module 36. The CRC-PREDICT model (e.g., CRC-PREDICT v.2.08r2) takes into account terrain and clutter effects. Because of this, it reportedly produces more accurate results than the other propagation models (e.g., five dB standard deviation with sufficient map data). In addition to accuracy advantages, a fully predictive model is attractive because of the relatively low overhead (compared to the "brute-force" method) in development and maintenance time, the possibility for inclusion of calibration data in the signature database itself, and the geographic completeness possible. Because predictive models involve irregular geographic regions, an efficient means of geo-referencing the transmitter locations and broadcast regions is desirable, and a means of geo-encoding transmitted data for dissemination by region is also desired.

5.5.1.1 Free space propagation model. The free space propagation model assumes the ideal propagation condition that there is only one clear line-of-sight path between the transmitter and receiver. As such, in the absence of any reflections or multipaths, radio wave propagation can be modeled using the free space propagation model which says:

$$S_r = S_t G_t G_r \left(\frac{\lambda}{4\pi d}\right)^2$$

where, $S_r$ is Received Power in Watts $S_t$ is Transmitted Power in Watts
$G_t$ is Transmit Antenna Gain (isotropic)
$G_r$ is Receive Antenna Gain (isotropic)
$\lambda$ is Wavelength
d is $T_x/R_x$ Separation in the same units as wavelength The equation can be expressed in dB units by taking the logarithm ($\log_{10}$) of both sides to obtain:

$$S_r(dBW) = S_t(dBW) + G_t(dBi) + G_r(dBi) + 20\log_{10}\left(\frac{\lambda}{4\pi}\right) - 20\log_{10}(d)$$

The last two terms of this equation combined are called Path Loss (PL) for free space propagation. This is the channel's loss in going from the transmitter to the receiver expressed in decibels. The first two right hand terms combined is called Effective Isotropic Radiated Power or EIRP. EIRP is the equivalent transmitter power required if an isotropic (0 dBi) antenna were used. Using these definitions the following equation is obtained where, for free space propagation; PL (dB)=$-20 \log_{10}(\frac{1}{4}pd)$:

$$S_r=(dBW)=EIRP(dBW)+G_r(dBi)-PL(dB)$$

For non free space propagation conditions, PL might be described by PL=A+B $\log_{10}$ (R). For more information on the free space propagation model see Friis, "A note on a simple transmission formula," *Proc. IRE,* 34, 1946; and U.S. Pat. Nos. 6,700,902; 6,542,719; and 6,360,079, which are hereby incorporated by reference in their entireties.

5.5.1.2 Other exemplary predictive propagation models. Rec. ITU-R P.370-7 and Rec. ITU-R P.1146, which are hereby incorporated by reference in their entireties, are recommendations promulgated by the International Telecommunications Union and can be ordered from the URL http://www.itu.int/publications/itu-r/. The Okumaru Hata propagation model is described in the article Okumura et al., 1968, "Field Strength and Its Variability in VHF and UHF Land-Mobile Radio Service," Review of the Electrical Communications Laboratory 16, Nos. 9-10, which is hereby incorporated by reference in its entirety.

CRC-PREDICT (e.g., CRC-PREDICT v.2.07, CRC-PREDICT v.2.08r2, and CRC-PREDICT v.3.21) is used for estimating radio signal strengths on terrestrial paths at VHF and UHF, given a transmitter location, power, and a receiver location. Since transmission paths are often obstructed by terrain, CRC-PREDICT can operate concurrently with a machine-readable topographic database consisting of elevation and surface codes; recorded at regular intervals (e.g. 500 meter intervals). CRC-PREDICT can also be used without such a database, either by manually entering path profiles or by using a general description of the terrain. When a path profile is present, the main calculation is that of diffraction attenuation due to terrain obstacles. These obstacles are primarily hills, or the curvature of the earth, but can also include trees and/or buildings. The presence and particular location of trees and buildings are considered in the calculation. However, their height and structure are not considered. The diffraction calculation is done by starting at the transmitting antenna and finding the radio field at progressively greater distances. At each step, the field at a point is found by a numerical integration over the field values found in the previous step. For long paths, tropospheric scatter becomes important. CRC-Predict combines the tropospheric scatter signal with the diffraction signal. For more information on CRC-Predict, see "Review of the Radio Science Branch of the Communications Research Centre Canada—Final Report," Performance Management Network Inc., March 2001 which can be found at the URL http://www.ic.gc.ca/cmb/welcomeic.nsf/vRTF/AuditJan2004E/$file/RadioScienceReview FinalReport.pdf and is hereby incorporated by reference in its entirety.

The Longley-Rice error propagation algorithm is reported in Longley and Rice, July 1968, "Prediction of Tropospheric radio transmission over irregular terrain, A Computer method—1968," ESSA Tech. Rep. ERL 79-ITS 67, U.S. Government Printing Office, Washington, D.C., which is hereby incorporated by reference in its entirety. The Terrain Integrated Rough Earth Model (TIREM) is described in IEEE Vehic. Tec. Society, Special Issue on Mobile Radio Prop., IEEE Trans. Vehic. Tech., vol. 37, 1988, pp. 3-72, which is hereby incorporated by reference in its entirety. The Egli error propagation model is described in "Radio Propagation Above 40 MC Over Irregular Terrain," Proceedings of the IRE, Vol. 45, October 1957, pp. 1383-1391, which is hereby incorporated by reference in its entirety. Additional propagation models that can be used to populate table update module 36 include the Carey model from FCC Report No. R-6406, "Technical Factors affecting the assignment of facilities in the domestic public land mobile radio service," by Roger B. Carey, Jun. 24, 1964, and Part 22 of the FCC Rules; the Bullington model from "Radio Propagation for Vehicular Communications," by Kenneth Bullington, IEEE Transactions on Vehicular Technology, Vol. VT-26, No. 4, November 1977; the Hata/Davidson model from "A Report on Technology Independent Methodology for the Modeling, Simulation and Empirical Verification of Wireless Communications System Performance in Noise and Interference Limited Systems Operating on Frequencies between 30 and 1500 MHz," TIA TR8 Working Group, IEEE Vehicular Technology Society Propagation Committee, May 1997; the Rounded Obstacle model from Section 7 "Diffraction Over a Single Isolated Obstacle" and Section 9 "Forward Scatter" of Tech Note 101 ("Transmission Loss Predictions for Tropospheric Communication Circuits", 1967, NTIS) and the National Radio Astronomy Observatory QZGBT program, each of which is incorporated by reference in its entirety. Additional discourse on error propagation models, including the physics considered in such models, is found in Neskovi et al., "Modern Approaches in Modeling of Mobile Radio Systems Propagation Environment," IEEE Communications Surveys, Third Quarter 2000, which is hereby incorporated by reference in its entirety.

5.5.1.3 Input data for error propagation models. Many of the error propagation models that can be used in the present invention work in conjunction with information on terrain (hills, elevation, etc.) There are numerous sources for such terrain data including, but not limited to, the United States Geological Survey (http://edc.usgs.gov/geodata/) for United States map data and the Ministry of Natural Resources for Canadian map data. Such information is available through distributors such as GEOREF Systems Ltd. (http://www-.georef.com/", and GeoBase Ltd. (http://www.geobase.ca/).

Furthermore, such error propagation models require the location of transmitters. FM transmitter reference sources include official registration bodies such as the Federal Communications Commission (FCC) (Washington, D.C.) and the Canadian Radio-television and Telecommunications Commission (Ottawa, Ontario). Data obtained from these sources is preferably verified both with commercially available information, station engineers and with actual field measurements. FCC FM transmitter information can be accessed by commercially available databases and/or cooperation agreements with companies such as Navteq (Chicago, Ill.). Navteq provides digital map information and related software and services used in a variety of navigation, mapping and geographic-related applications.

5.5.2 Empirical models. Empirical models compare current radio signature 50 to radio signatures 39 measured at predetermined locations using the techniques described above in conjunction with FIGS. 1 through 3. Typically, the use of empirical models is unable to match exact signatures. Rather, the approach determines the "closest match," thus giving an approximate location within acceptable error bounds.

For the empirical model to be useful, a large set of measured data is produced so that an accurate reflection of all geographies in the eNav application area is available. This model lacks the geographic completeness of the predictive model. However, for smaller geographies (e.g. a state, a city, or town) it can provide comprehensive support. Since the empirical approach will generate a database of known "real" signatures, terrain and clutter calibration, if any, is done at the sensing end of the system (in-vehicle) before signature comparison is possible. A possible advantage of the empirical approach is the potential regularity of the geographic regions encompassed by each radio signature 39. With a predictive model, broadcast areas may be irregular and small anomalous regions can be created by irregular terrain. The irregularity of the regions and the possibility for many smaller regions with distinct signatures might require much more complex encoding and decoding methods for the dissemination of location-sensitive information. The possibility of regularly spaced regions using an empirical model is more conducive to efficient and simple encoding schemes. It should also be noted that an empirical model does not require knowledge of transmitter locations or broadcast areas. This does not mean that transmitter changes will not affect the system. On the contrary, an empirical model of this nature requires significant resources to accurately maintain, as updates to table update model 36 (under the empirical approach) will require both man power and travel time.

5.6 Exemplary System

Figure 4:
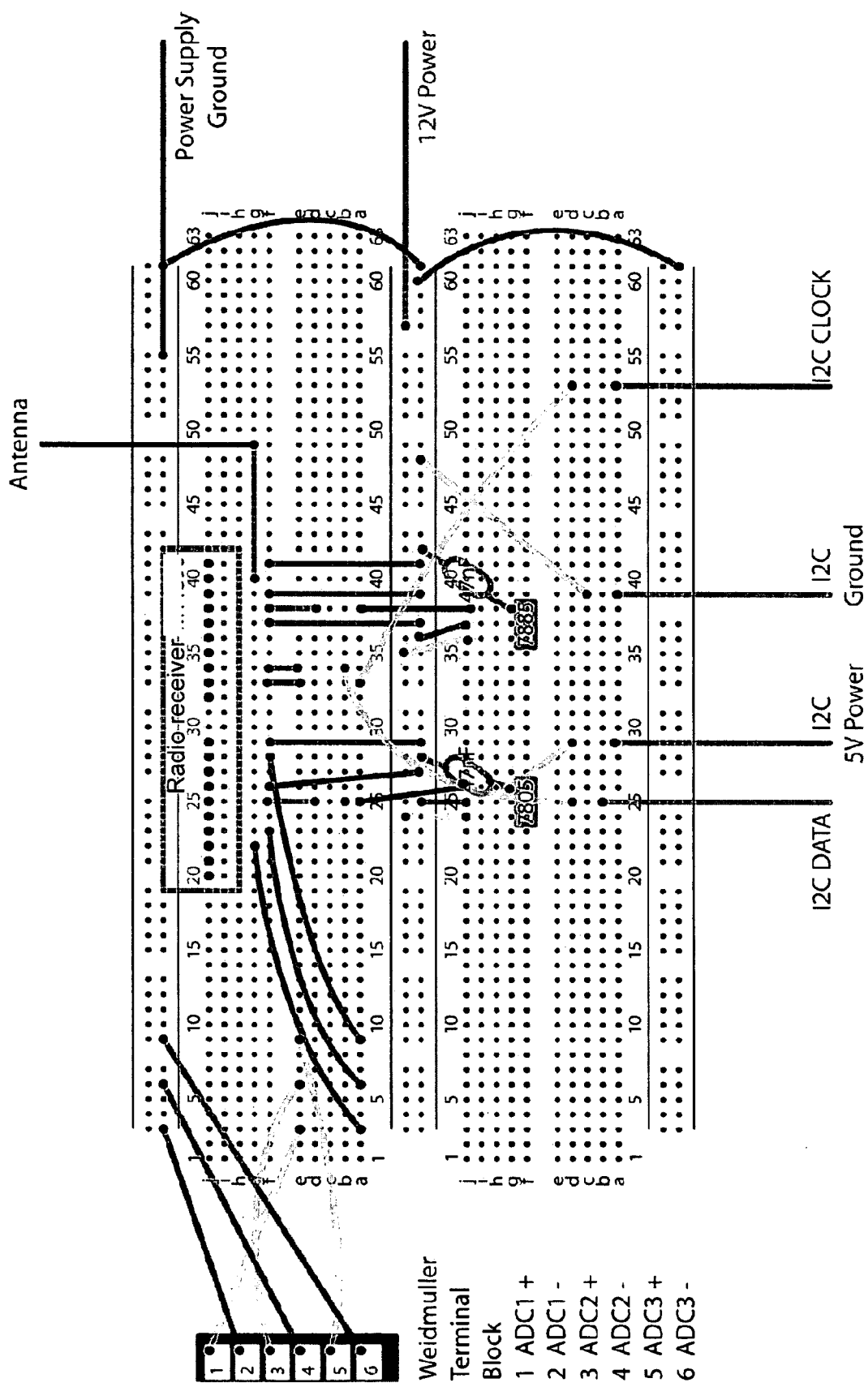
FIG. 4 illustrates a circuit diagram for an exemplary system for measuring signal strength across a spectrum of wavelengths for use in populating a radio signature lookup table in accordance with an embodiment of the present invention.

To test the methods of the present invention, an exemplary system was built. The system includes a generic RDS radio receiver FM Module, implemented on a breadboard (e.g., a Wish board no. 204-1). This fully integrated FM module provides a way to access an analog FM quality reading (as well as a multipath rating and RDS quality reading) at any given frequency. The FM quality signal is used as a good indicator of field/signal strength (signal quality 42 FIG. 1A) across the FM frequency band at any given position. The module is also flexible in that it provides electronic tuning and parameter control through an I2C interface (which can be accessed by the laptop through an interface board on the printer port). A circuit diagram of this breadboard is shown in FIG. 4. The generic RDS radio receiver requires very little external hardware for implementation, but power was supplied by a 12 volt Compaq power supply (Series PS2022). One other external in the exemplary system is an FM band antenna that is of the simple automotive whip type. The case of a PC was used to as a mounting point for all of the other equipment, such as the breadboard and the Weidmuller terminal block, in the exemplary system. The Weidmuller terminal block provides a physically sturdy connection for the analog outputs of the radio receiver to the data capture unit. The data capture unit resides in a 12 bit 250 Ksps, 16 channel ADC Elan Digital Systems (Segensworth West, Fareham, United Kingdom) AD132 DAQ PCMCIA card that is installed in slot one of a Dell (Austin Tex.) PPI Inspiron 7500 personal computer. The analog-to-digital capabilities of this card are used to record the FM Quality, Multipath output and RDS Quality signals from the radio receiver, all of which originate from the radio receiver as voltages in the range of zero to five volts. After conversion, all the digital values are both displayed on the laptop graphical interface and stored on the hard drive.

Figure 5:
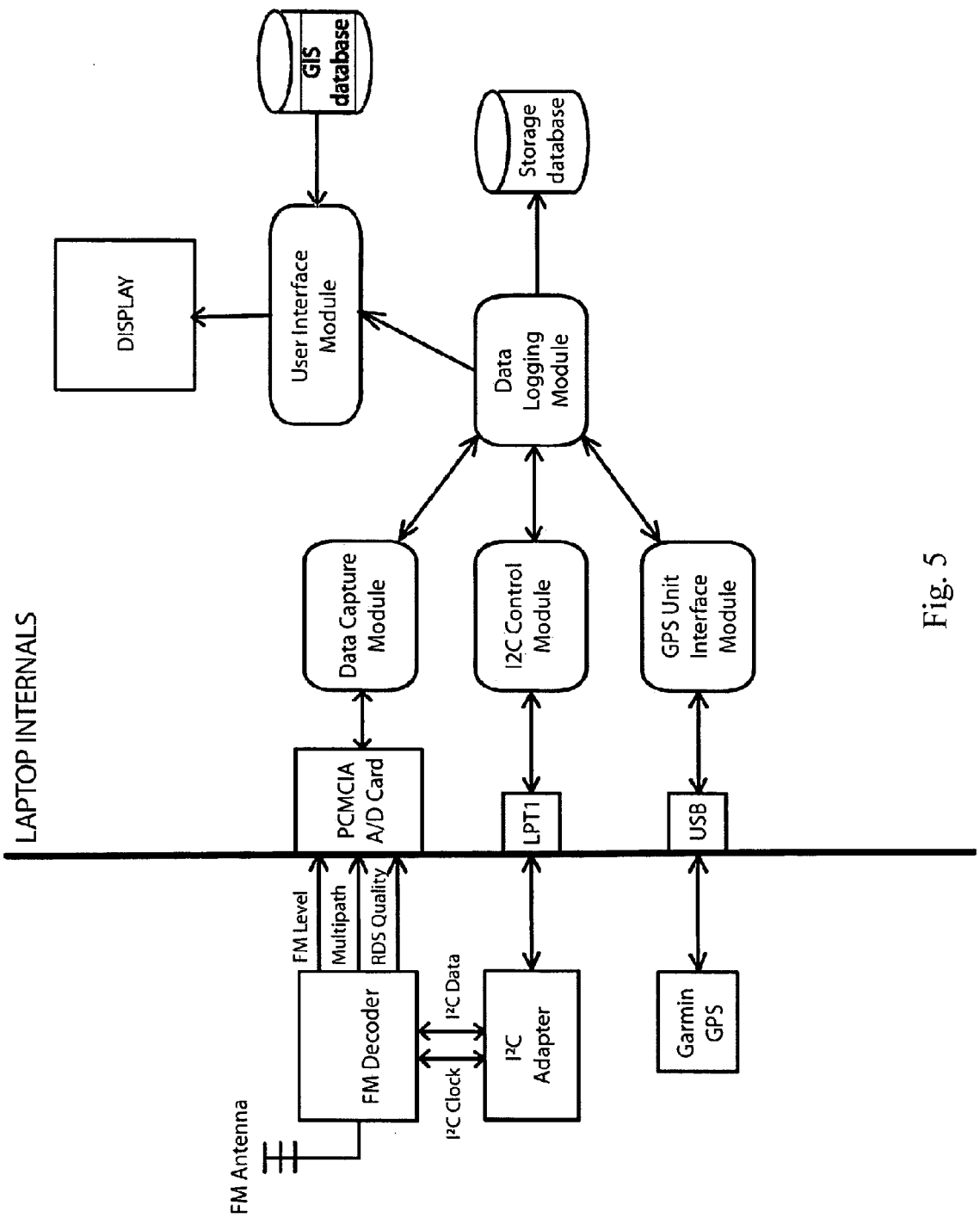
FIG. 5 illustrates a system component diagram for an exemplary system for measuring signal strength across a spectrum of wavelengths for use in populating a radio signature lookup table in accordance with an embodiment of the present invention.

In order to provide a baseline or context from which to develop a model, a Garmin GPS unit 35-USB (Garmin International Inc., Olathe, Kans.) was used to gather the various positional and velocity coordinates and the accurate time when the analog readings are taken. This unit provides approximately 10-meter accuracy without correction, which is more than sufficient for the granularity of the exemplary system. The GPS coordinates and time are stored with the analog reading values on the laptop hard drive. The GPS unit communicates with and is powered by the USB interface. A system diagram of this setup is illustrated in FIG. 5.

A variety of software modules were run on the laptop computer in order to collect the desired date. One low level software module was an I2C control module. The I2C control module provides the ability to set values on the RDS radio receiver through the I2C interface board. The I2C interface board was obtained from demoboard.com. The I2C board allows the I2C control module software to electronically tune the radio receiver to any given frequency in the FM band. The I2C board and corresponding control module also provide access to FM demodulation parameters used inside the radio receiver. Such parameters could be used as additional signal quality characteristics 42.

Another software module installed on the laptop computer is a data capture module. The data capture module interfaces with the AD132 PCMCIA at the Windows DLL level to allow for configurable sample rate and sampling time (which taken together give a fixed number of samples). Although other values could be used, the internal settings were set to sweep at 1000 samples/second for a length of one second per FM frequency. The data capture includes routines to perform evenly weighted averages and output the average value to higher-level modules. The process is adaptable to multiple inputs and is set by default for three analog inputs.

Another low level software module implemented on the laptop computer is a GPS Unit Interface Module. The GPS unit interface module decodes a serial stream provided by the USB-to-Serial driver into geo-position variables like latitude, longitude, speed, heading and time, placing them in internal variables for display and data-logging. Analog readings that are taken by the Data Capture Module are related back to reality by combining them with a position and time. The GPS values provide this baseline. A limitation of this experimental system is that updates are only available from the hardware every second. Because the experimental model's granularity in time and position will be much larger, this did not affect results significantly.

Figure 6:
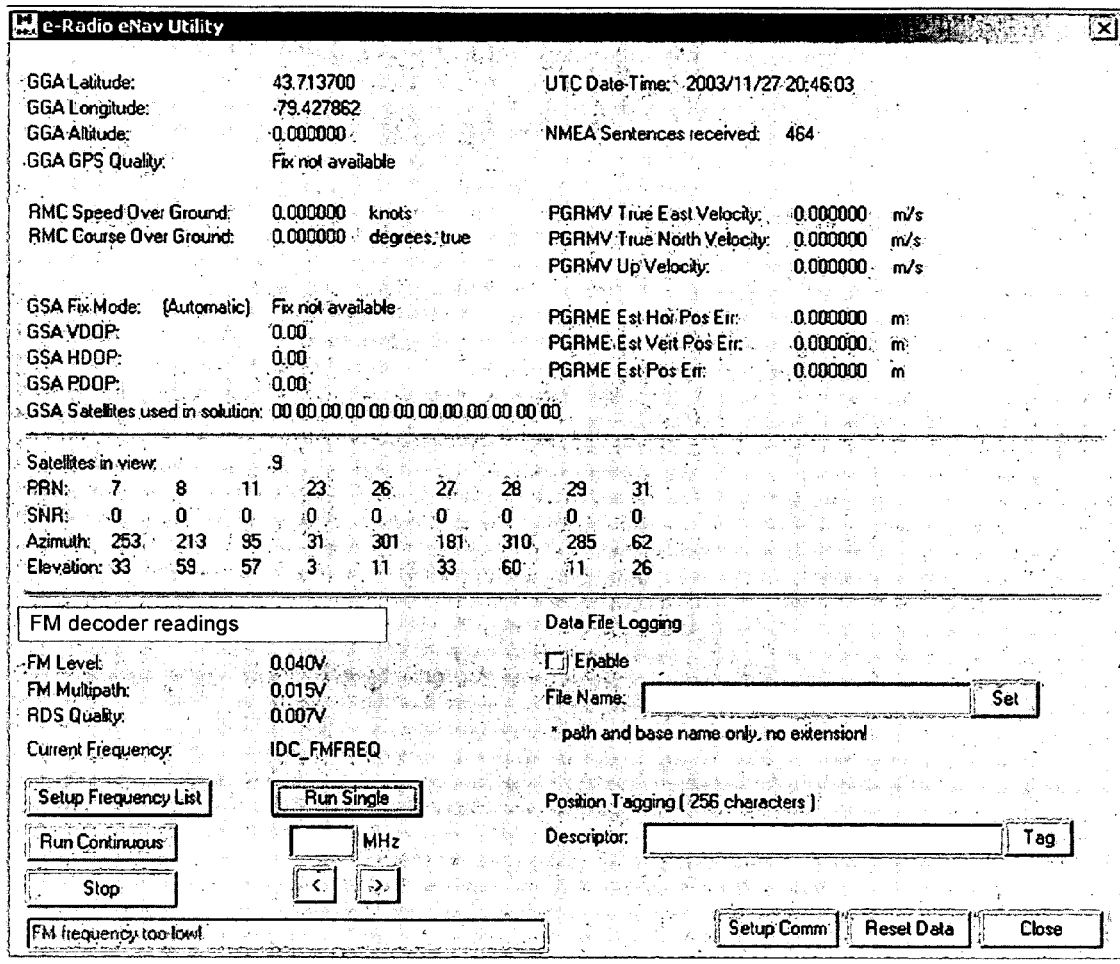
FIG. 6 illustrates a graphical user interface for monitoring data used to populate a radio signature lookup table in accordance with an embodiment of the present invention.

In addition to the low level modules, higher level modules were also implemented on the lap top computer. Such modules included a data logging module. Given any set of internal variables (which is completely configurable) this module will log those data values to a comma-separated file each time a trigger is activated. Internally, this occurs after the GPS position and time are collected and the analog values are recorded for the current FM frequency. It also provides the facility to give a "name tag" to the current GPS location and log it to a separate file for later reference. Another high level interface was a user interface module providing a graphical user interface (GUI) to the other modules in the system. The GUI displays current values of all internal variables of the program (GPS, analog readings, and FM frequency). The GUI can configure which list of FM frequencies to sweep and change the target log file. It has the ability to produce independent geo-code/time tags with text descriptions with button click. Controls are available to start and stop the automatic frequency sweep/data-capture process or to generate FM quality, multipath and RDS quality readings at one specific frequency. A screenshot of this exemplary GUI is illustrated in FIG. 6.

5.7 Signature Uniqueness

A preliminary signature uniqueness study was conducted using transmitter registration data and the equipment described above and depicted in FIGS. 4-6. It was found that, in Canada and the United States, the majority of signatures containing more than a single FM signal (that is, more than one transmitted frequency), are unique. In fact, of all signatures that have more than a single signal, there are, at most, three cities that have the same signature. It should be noted that this is not an exhaustive uniqueness study for several reasons. First, transmitter locations do not necessarily correspond to registration cities. Second, the signature at any given location often depends on transmitters in surrounding cities as well as the current one. That is, broadcast areas do not correspond to city boundaries). Third, the signature within a given city can vary due to low power transmitters (e.g., with broadcast areas smaller than the city boundaries) and due to terrain and clutter effects (e.g., there can be more than one signature per city).

Another important observation that can be made based on this registration data is that, regardless of the correspondence between transmitter locations and city boundaries, there are relatively low upper bounds on the number of transmitters for each frequency in Canada and the United States. That is, based on a single frequency, the location of the receiver can be determined to within less than 200 (maximum) possible locations within all of Canada and the United States. These findings provide clear support for the systems and methods of the present invention.

5.8 Experimental Model Development

Figure 7:
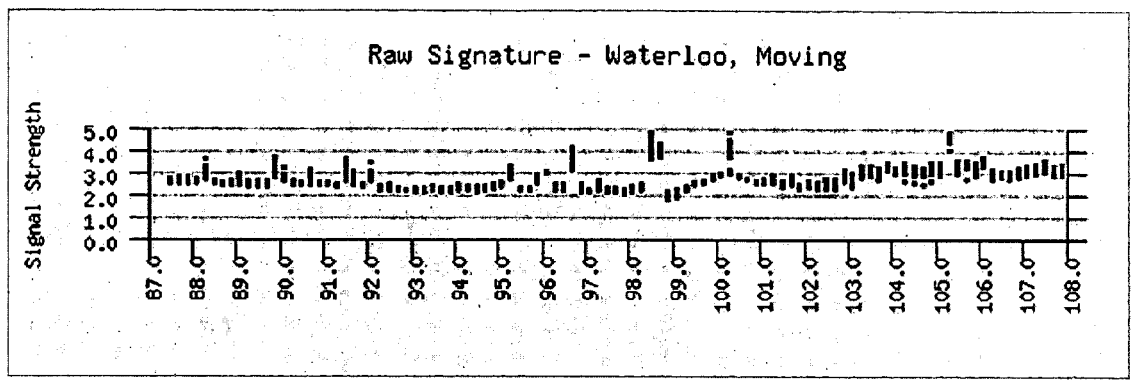
FIG. 7 illustrates measurements taken in a drive test in the Waterloo area of Canada for an empirical model in accordance with the present invention.

Several drive tests in the Waterloo area were used to determine whether or not generating baseline data for an empirical model was viable. The measured signature for a moving drive test in and around a portion of the Waterloo area is shown in FIG. 7 before normalization and in FIG. 8 after normalization. The figure shows the approximate variation of the various FM frequencies within the target area, indicating that of a sensed FM signature with signal peaks at 96.7, 98.5, 100.3, and 105.3 should correspond to this geographic region. To verify this, a comparison to transmitter registration data was done. While there are 110 cities with transmitters for 96.7, 81 cities with transmitters for 98.5, and 89 cities with transmitters for 105.3 (see FIG. 9), there is only one city with all three frequencies: Kitchener, Ontario. The presence of 100.3 effectively subdivides the broadcast regions for the Kitchener-based transmitters, as there is only a signal for this frequency in a portion of the test locations. It turns out that the transmitter for this frequency is a low power transmitter used for the University of Waterloo radio station. Thus, within the broadcast area of the Kitchener-based transmitters, only those areas within a certain distance of the University of Waterloo would yield FM signatures that include 100.3 FM. This is clear evidence that the systems and methods of the present invention can uniquely determine receiver location with a granularity smaller than a single broadcast region. This drive test also indicates that the systems and methods of the present invention will function using an empirical model by comparing sensed FM signatures to baseline data (such as the data collected for the Waterloo region). The use of empirical model such as that described in this example is only practical in small target areas. For larger areas, predictive models are preferable.

5.9 Signature Comparison

A declining threshold method can be used with either an empirical model or a predictive model, as not all sources of error can be accounted for in either model. Using a declining threshold method on the data obtained from the Waterloo drive test yields a set of comparisons. First 98.5 and 105.3 are considered, because they are the maximum peaks. Already this places the receiver in a limited number of regions. As the threshold declines, 100.3 may or may not be considered depending on how close the receiver is to the University of Waterloo. The inclusion of 100.3 places the receiver in the Waterloo/Kitchener region. Already, by considering three peak frequencies, the receiver position has been uniquely determined. If the frequency 100.3 is not included in the signature, then 96.7 is the next peak to cross the declining threshold. Use of the frequencies 96.7, 98.5, and 105.3, places the receiver within the Kitchener broadcast region. As the threshold continues to decline, the additional peaks of 88.3, 89.9, 91.5, 92.1, and 95.3 place the receiver in a subsection of the Kitchener broadcast area where these signals can be sensed.

Figure 8:
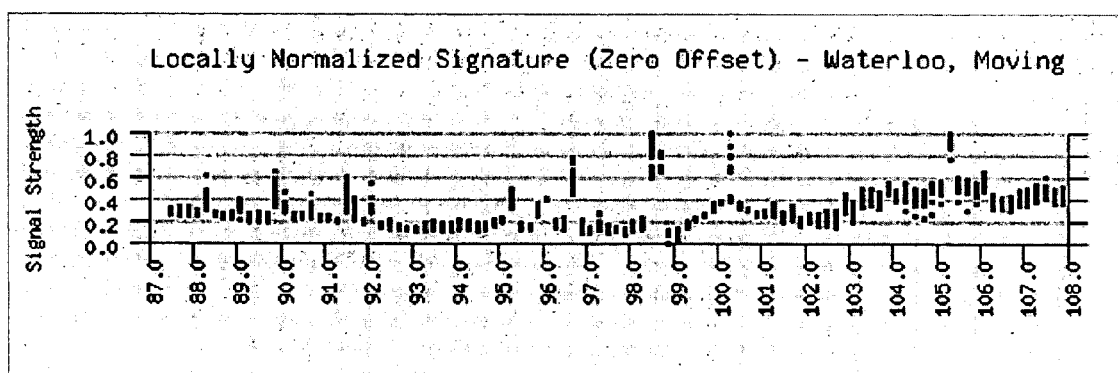
FIG. 8 illustrates measurements taken in a drive test in the Waterloo area of Canada for an empirical model, after normalization, in accordance with the present invention.

At this point it should be noted that 98.7 and the multitude of signals in the higher portion of the FM band (above 102.5) were not considered in the declining threshold method. The higher portion of the FM band was not included in the declining threshold method because none of the frequencies (with the exception of 105.3, which was included in the comparison) are obvious peaks above their neighboring frequencies. This illustrates the point that the declining threshold method of comparison only considers peak data. While the signature in FIG. 8 is locally normalized, only the global FM floor (that is, the floor common to all frequencies in the FM band) is removed in order to produce this normalization. A better method of normalization, such as a windowing method, would be more useful for differentiating between strong signals and signal peaks.

5.10 Sources of Noise

Figure 10:
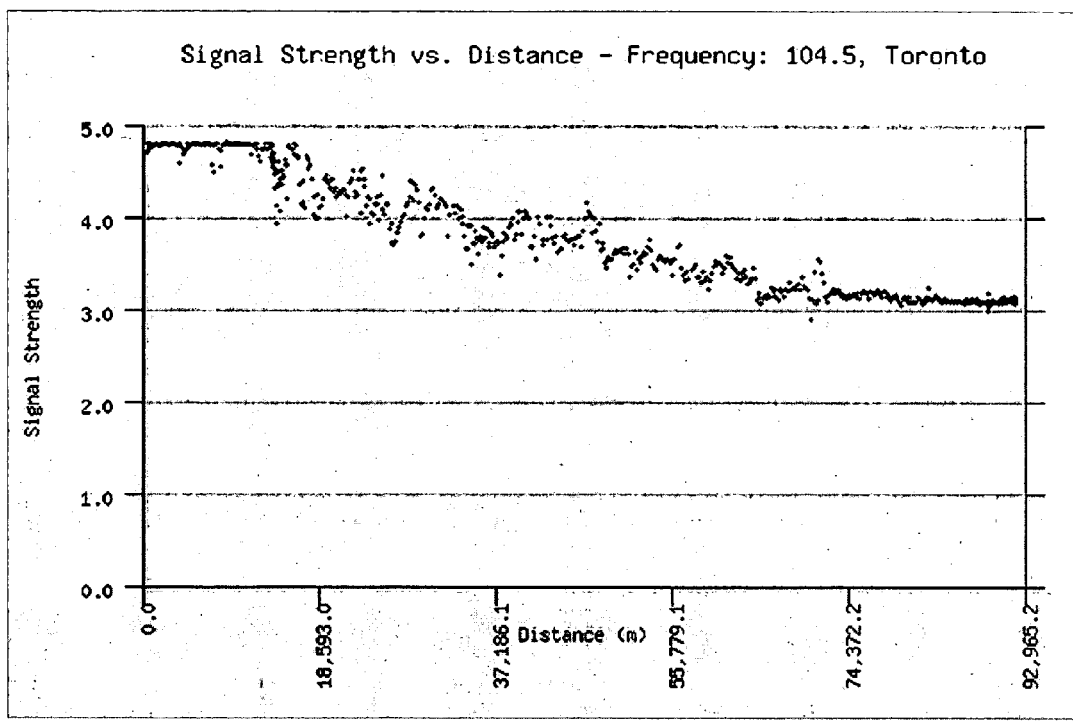
FIG. 10 illustrates signal strength plotted against distance from the transmitter at the FM frequency 104.5 using a J2 elliptical model for the Earth to calculate the absolute distance between the transmitter and receiver based on recorded GPS coordinates.
Figure 11:
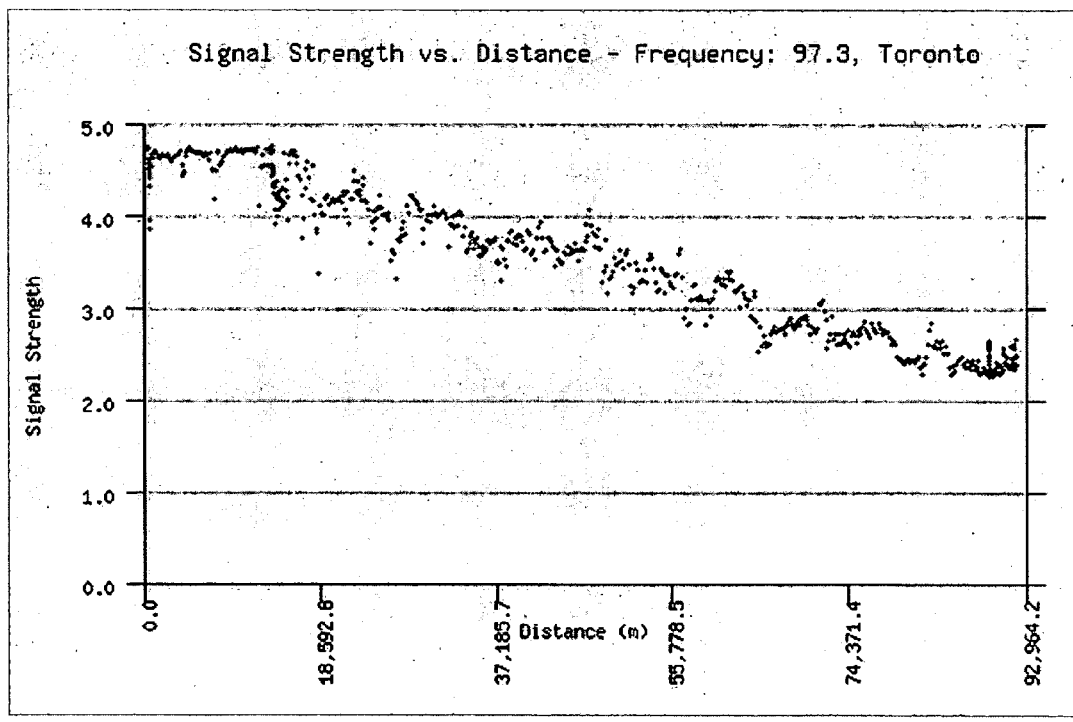
FIG. 11 illustrates signal strength plotted against distance from the transmitter at the FM frequency 97.3 using a J2 elliptical model for the Earth to calculate the absolute distance between the transmitter and receiver based on recorded GPS coordinates.

Several sources of noise affect the FM signature sensed by a receiver. To isolate the various kinds of noise, several targeted drive tests were conducted. First, a test run was performed from Waterloo to Toronto by measuring a few select frequencies for which there is decent signal reception while on route from Waterloo to Toronto. The results of these measurements are shown in FIGS. 10 and 11, with signal strength plotted against distance from the transmitter (using a J2 elliptical model for the Earth to calculate the absolute distance between the transmitter and receiver based on recorded GPS coordinates). These figures illustrate several important trends. Close to the transmitter, the recorded signal levels appear to be saturated, most likely due to limitations in the test hardware (representative of limitations that might be present in production receivers). While this has no ill effect on the FM signature at these locations, very little information about the noise characteristics of the signal can be gleaned at these distances. FIGS. 10 and 11 also illustrate the general trend of the signal declination with distance from the transmitter, although the signal does not drop off as one might expect (1/distance$^2$ in free space). This illustrates the importance of a correlation between the resulting geopolygons generated with a predictive model and the sensed signals using receiver hardware. In other words, the "signal level" recorded by the test hardware, representative of production receiver hardware, does not necessarily have a direct correspondence to the Electromagnetic Field Levels that will be generated by a predictive model. This reaffirms the utility of a simple comparison methods, such as the declining threshold, whereby the location of the receiver is determined using only the most prevalent data trends (e.g., signal peaks). The general trend observed in FIGS. 10 and 11 also show how that signals degrade gradually with distance as opposed to sudden loss of reception. This phenomenon significantly aids in the determination of location and direction, as the method of comparison can use weaker signal peaks to resolve the receiver location within a parent region defined by stronger signal peaks. If signal reception terminated suddenly, such granularity would not be obtainable.

Another observation that can be made from the results of the Waterloo-Toronto drive test is related to sources of noise. Between 20 km and 100 km from the transmitter, the noise displays two main trends. Higher order noise, most likely corresponding to local clutter (both fixed and moving), transmitter variations, varying antennae gain characteristics, and local weather conditions can be observed at all distances. Lower frequency noise can also be observed, and is more obvious at distances further from the transmitters. As the transmitters selected are located in Toronto, distances further away correspond to areas with less ground clutter (hence less high frequency noise), thus making the low frequency effects more visible. This suggests that the lower frequency noise corresponds to more prevalent sources of error such as terrain effects. A full spectral analysis of the data shown in FIGS. 9 and 10 could be used to provide appropriate error bounds that can be applied to the signal at any distance from the transmitter.

Figure 12:
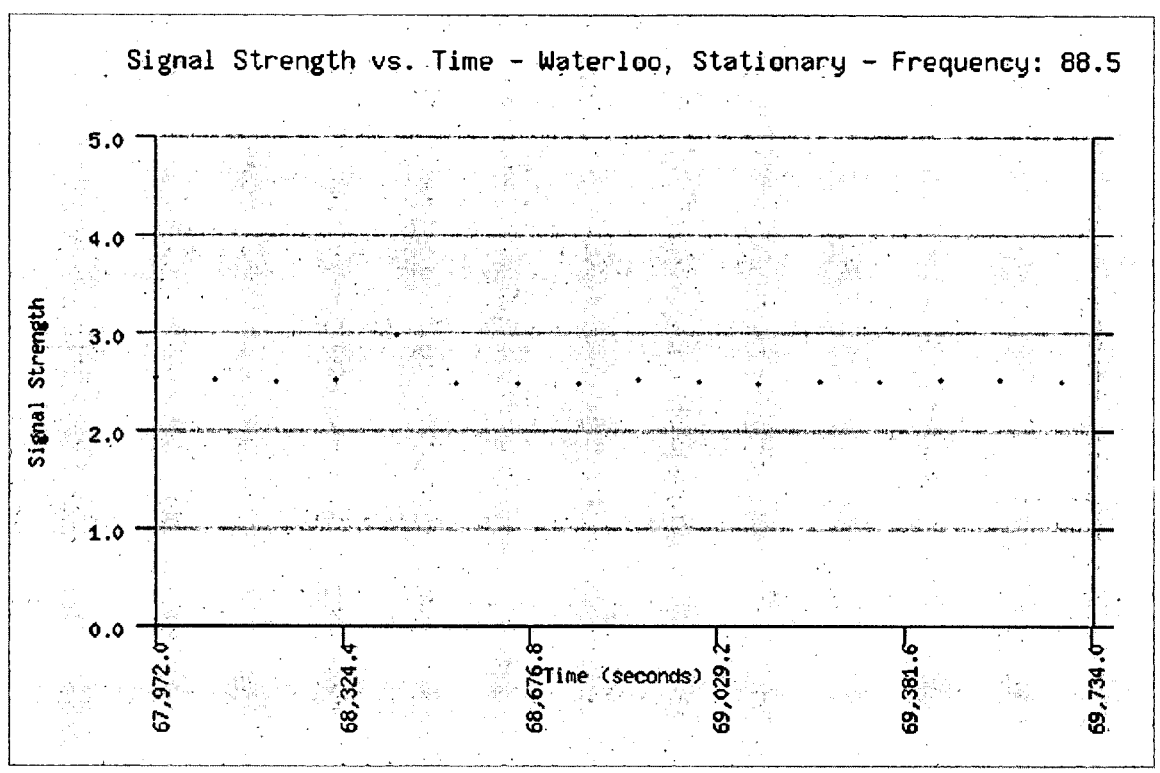
FIG. 12 illustrates measurements taken for a particular frequency in a stationary test conducted in the Waterloo area, in a relatively flat area with very little visible terrain variation and almost no ground clutter in the immediate area.
Figure 13:
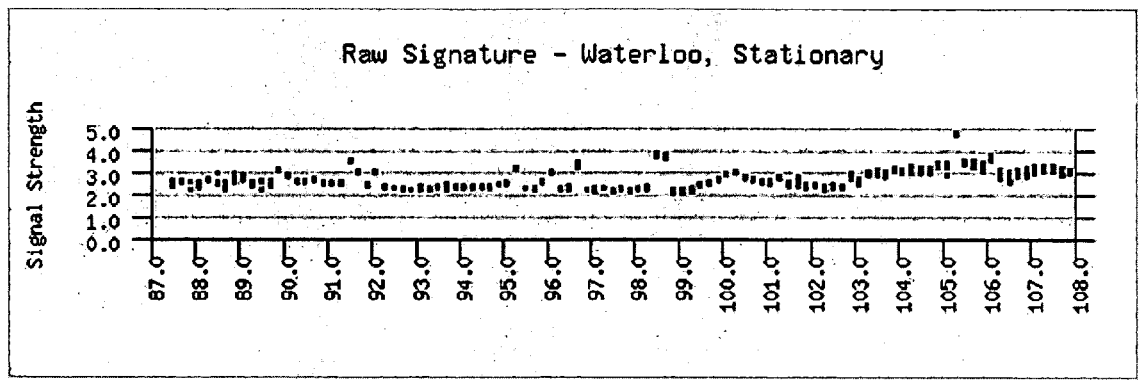
FIG. 13 illustrates an unnormalized stationary FM signature for a test location.
Figure 14:
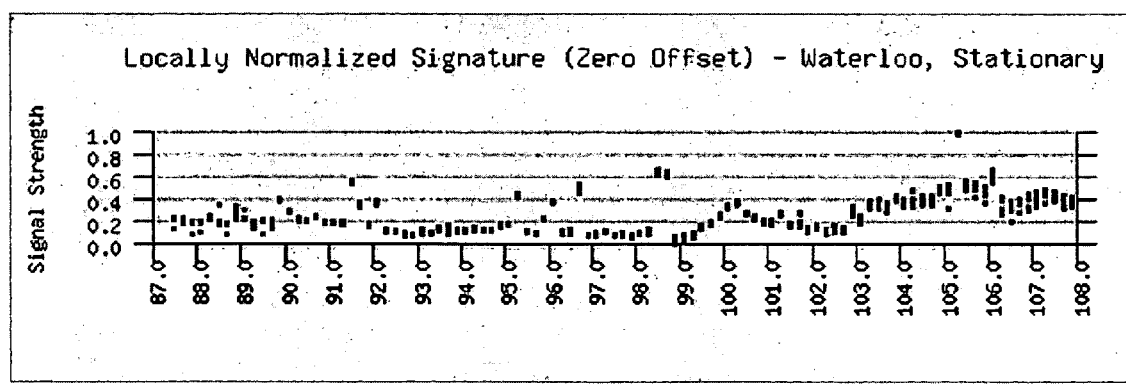
FIG. 14 illustrates a normalized stationary FM signature for a test location.

More isolated tests have been conducted to verify the relationship between the various frequencies of noise and their sources. A stationary test was conducted in the Waterloo area, in a relatively flat area with very little visible terrain variation and almost no ground clutter in the immediate area. The purpose of the test was to determine the error associated with variations in the radiated power from the transmitters, with variable antennae gain characteristics, and with weather conditions between transmitter and receiver. It should be noted that it is difficult to distinguish between these sources of noise with real-time data tests. From an operational perspective, there is no need to distinguish between them, as long as the error bounds are considered reasonable. Thus, these sources of error can be considered as one. It should also be noted that, even in such a remote location, local traffic was not completely absent. FIG. 12 illustrates the measurements that were made. The few spikes present in FIG. 12 correspond to times when vehicles passed by. This leads to an important observation, the effects of transmitter, antennae, and weather variations are much smaller than those due to local clutter. FIGS. 13 (before normalization) and 14 (after normalization) show the stationary FM signature for this test location. It is clear from these plots that the average signal error is much less than that shown in FIGS. 7 and 8 (corresponding to moving tests), reaffirming the observation that signal variations due to transmitter, antennae, and weather effects are much less than those associated with ground clutter and terrain. As a point of interest, it is also noted that the signature for the stationary location (further outside of town than for the moving test) is slightly different from that obtained from the moving Waterloo drive test (FIGS. 7 and 8).

Some receiver-dependent characteristics also affect the sensed FM signature. In particular, the signal floor resulting from hardware limitations (DC offset, settling time) or from ambient noise in the FM band can significantly affect the form of the FM signature. As shown in FIG. 7, the un-normalized signature for the Waterloo region suggests signal reception from a wide variety of FM channels for which there are no transmitters present. Using the declining threshold method, only the peaks of the signature are important defining characteristics (and in FIG. 7, the peaks of 96.7, 98.5, 100.3, and 105.3 seem to be the most prevalent). A normalized version of the FM signature with the floor offset removed is shown in figure FIG. 8. This local normalization emphasizes the defining peaks as relative values to all other frequencies. Again, it is clear that FM frequencies 96.7, 98.5, 100.3, and 105.3 are the most important defining frequencies, but the normalized plot also makes several other useful results more apparent. In particular, 88.3, 89.9, 91.5, 92.1, and 95.3 are displayed as peaks above the nominal values in the lower FM band. Based on transmitter registration data, the frequency 92.1 is broadcast from Brantford, Ontario; the frequency 88.3 is broadcast from Paris, Ontario; and the frequency 95.3 is broadcast from Hamilton, Ontario. Since Brantford, Paris, and Hamilton are all within broadcast range of the Waterloo region, it makes sense that their signals would appear as peaks in the Waterloo FM signature. Since 89.9 and 91.5 are both broadcast from Windsor and Ottawa, both of which are too far from Waterloo for there to be a signal included in Waterloo's FM signature, and since a manual radio tuning to these frequencies resulted in audio radio reception, it is evident that the database of transmitters relied upon must not be complete. Building a database of signature-based regions from an incomplete list of transmitters would result in an incomplete or inaccurate database.

It should also be noted that the normalized data also emphasizes the error associated with the various signals while driving around the Waterloo region. This error, along with those obtained through other targeted drive tests can be used as a calibration source. In this particular case, the major peaks corresponding to transmitters in the Waterloo/Kitchener region are sufficient to place the receiver within Waterloo, and the inclusion of the low-power University of Waterloo radio station (100.3) subdivides this region into two areas. The inclusion of additional signals from surrounding regions will most likely serve to subdivide the region further (distinguishing the southern reception areas for Waterloo/Kitchener transmitters from their northern regions). Another important observation relevant to signal calibration is the presence of spectral leakage for frequencies close to those of certain transmitters. Since transmitters in a larger (parent) region are usually separated by more than 200 kHz, the occurrence of an FM signature with two adjacent FM peaks is usually representative of spectral leakage (easily observed by tuning the radio to the next possible FM channel and being able to make out the sounds of the adjacent FM channel). The term "spectral leakage" is used loosely here because it is not clear whether or not this effect is due to transmitter properties or due to receiver properties. That is, it is possible that hardware limitations on the FM tuner cause this apparent problem. In some embodiments, this phenomenon is taken into consideration in the method of comparison, so that signatures with and without adjacent signals are considered for matching with known signatures.

In preferred embodiments, the various sources of noise are accounted in order to improve the accuracy of the comparisons that are made. As described above, several tests (both stationary and moving) were performed to identify and isolate the various sources of noise. These tests resulted in the following observations.

Sources of noise include receiver limitations and variations (DC offset, settling time, saturation); atmospheric (cloud cover, precipitation, pressure); multipath due to fixed objects (terrain, stationary obstacles); multipath due to moving objects (other vehicles); and transmitter limitations and variations (power fluctuations). Wherever possible, noise should be taken into consideration in the development of the radio signatures 39 so that computation is minimized in the receiver. Only fixed sources of noise can be accounted for in this manner (terrain and stationary objects).

Receiver limitations will vary from receiver to receiver, and so must be taken into account locally (if any attempt is made to account for such effects). Preferably, a method of sensing that removes (or minimizes) this error should be used before signal processing is done so that one method of comparison can be used for all receivers.

For sample data that isn't saturated (due to receiver limitations), the noise displays two main trends. Higher order noise, most likely corresponding to local clutter (both fixed and moving), transmitter variations, varying antennae gain characteristics, and local weather conditions. Lower frequency noise can also be observed, and is more obvious at distances further from the transmitters. As the transmitters used for the testing described above are located in Toronto, distances further away correspond to areas with less ground clutter (hence less high frequency noise), thus making the low frequency effects more visible. This suggests that the lower frequency noise corresponds to more prevalent sources of error such as terrain effects.

It is extremely difficult to distinguish between noise due to transmitter variations, antennae limitations, and weather variations in a live environment. Additionally, stationary tests revealed that the effects of transmitter, antennae, and weather variations are much smaller than those due to local clutter. Several methods for dealing with the various sources of noise are presented below.

5.11 Sampling Rate

Through the use of the test hardware described above (used to represent the limitations of existing tuner modules), it was determined that the effects of settling time, as a result of frequency switching, can be minimized simply by using the average values of a large set of sample data. Thus each recorded value is the average of many sampled values. Both the sampling rate and the sampling interval can be selected to minimize this source of noise.

5.12 Normalization

It is desirable to remove (or reduce) the noise associated with receiver limitations before signal processing (or comparison) is done, so that the same algorithm can be used for all receivers. Through the various drive tests, it was observed that, close to a transmitter (typically within 20 km for high power transmitters), the recorded signal appeared to be saturated. It was also noted that there appeared to be a signal floor (minimum value higher than 0), most likely corresponding to a DC offset in the tuner module. While these receiver limitations have no real ill effect on the FM signature at a particular location, very little information about the noise characteristics of the signal can be gleaned in these ranges. Normalizing the data (removing the DC offset, and only considering non-saturated values) with receiver specific configuration values provides a receiver-independent data set that can then be analyzed. This data set was then amplified (as part of the normalization process) to increase the separation between data peaks. This was done to improve the quality of the signal processing. It should be noted that, while this amplification also served to exaggerate the effect of noise in the signature, it most likely increased the stability of the comparison method by reducing its required sensitivity.

5.13 Windowing (Peak Isolation)

Another important observation relevant to signal calibration is the presence of spectral leakage for frequencies close to those of certain transmitters. Since transmitters in a larger (parent) region are usually separated by more than 200 kHz, the occurrence of an FM signature with two adjacent FM peaks suggests spectral leakage (easily observed by tuning the radio to the next possible FM channel and being able to make out the sounds of the adjacent FM channel). The term "spectral leakage" is used loosely here because it is not clear whether or not this effect is due to transmitter properties or due to receiver properties. That is, it is possible that hardware limitations on the FM tuner cause this apparent problem. In preferred embodiments, this phenomenon is taken into consideration in the method of comparison, so that signatures with and without adjacent signals are considered for matching with known signatures.

Only signal peaks are used in signature comparison in preferred embodiments of the present invention. For example, in the experiments described above, a simple windowing method was used to remove the apparent "spectral leakage", and to isolate the true signal peaks. As this processing must be done in real time, in-vehicle, the simplest possible windowing method was used. For a particular window size, only consider the maximum value within the window. The size of the window is chosen to reflect the typical separation between active FM transmitter frequencies (so that the true signal peaks are not removed from the signature).

5.14 Peak Detection

A declining threshold method (FIG. 3) can be used with either an empirical model or a predictive model, as not all sources of error can be accounted for in either model. The declining threshold method also has the advantage of simplicity, requiring minimal computation by effectively ignoring all but the most pertinent data. This method also provides for various levels of granularity, with very course predictions given almost instantly, and a more refined prediction after each iteration, until an exact match is found.

Through drive tests, especially in the Waterloo area (described above), various observations were made that illustrate the benefits of the methods implemented in the present invention. First, the tests indicate that peak data is sufficient for the unique determination of the receiver's location within the target area (Canada and the Continental United States). Second, the general trend of recorded signal declination with distance from the transmitter is not necessarily as one might expect ($1/distance^2$ in free space). That is to say, the signal level recorded by the test hardware (representative of production receiver hardware) does not necessarily have a direct correspondence to the Electromagnetic Field Levels that will be generated by a predictive model. Thus, with the use of a predictive model that determines what the Electromagnetic Field strength should be at particular locations, a simple method of comparison could be used that is, more or less, independent of the particular unit of measure used. The declining threshold method is useful in this respect, as it can serve to compare to similar, but not identical, entities.

Third, signals degrade gradually with distance (as opposed to sudden loss of reception). This will significantly aid in the determination of location and direction, as the method of comparison will use weaker signal peaks to resolve the receiver location within the parent region (determined using stronger signal peaks). While a direct binary comparison (the signal is either present or not present) might return the same signature for two similar regions, the declining threshold method will provide the order in which individual signals should be considered, thereby differentiating between two similar regions with slightly different signal strengths.

Fourth, the method of comparison cannot be done algorithmically using transmitter registration information alone, as there are currently no defined relationships between the registrations for different cities. That is, until the transmitters are displayed geographically and the broadcast regions are geo-encoded (or until a sufficiently granular set of empirical baseline data points are generated), there is no way to determine that the transmitter information data for two cities can be combined to form a single signature (as there is no way to algorithmically determine whether or not two cities are close to each other based on transmitter registration data).

5.15 Advanced Error Propagation Models

As discussed earlier, wherever possible, fixed sources of noise should be taken into account when generating radio signatures 39 so that the amount of real-time computation (comparison) can be minimized.

It is not entirely clear how well empirical models account for the sources of noise. While the signatures at the exact recorded locations reflect the actual signature that will be received at that particular location, the signatures received within the same region, but not at that particular location, may not be identical. To illustrate, assume that reference data is collected in a grid-like manner, at points separated by 10 km. Each reference signature, then, would represent a 10 km by 10 km area. All received signatures in that area will not be identical (especially in an urban environment where there is significant, varying ground clutter). Two ways to avoid this problem with an empirical model include: reducing the grid size to improve accuracy, or using averages values in a region to determine a single representative FM signature. Reducing the grid size could yield extremely accurate results, but with significant cost in terms of development and maintenance. Using averaged values makes the inclusion of noise in the model less clear. What sort of processing would be required on a receiver to match such an averaged reference signature is, as yet, unknown.

Ideally, a model that includes specific sources of noise accurately, and other sources of noise not at all, would provide for a robust system of comparison in which the receiver is responsible for filtering out only particular sources of noise. An empirical model with a very small grid size would be ideal for such a system, but very impractical to implement.

A predictive model that takes into account the effects of terrain and fixed clutter is suitable. This leaves the receiver with the following sources of noise to filter out: receiver limitations (which can be accounted for as described in the previous sections), atmospheric and transmitter variations (which have minimal effects, as discussed previously), and moving objects. In addition to helping minimize the effects of receiver limitations, using time-averaged values can also help to reduce the error associated with moving objects. Thus, a predictive model that can account for terrain and fixed clutter effects is a preferred in some embodiments of the present invention.

6. CONCLUSION

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain the program modules shown in FIG. 1. These program modules may be stored on a CD-ROM, DVD, magnetic disk storage product, or any other computer readable data or program storage product. The software modules in the computer program product can also be distributed electronically, via the Internet or otherwise, by transmission of a computer data signal (in which the software modules are embedded) on a carrier wave.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed:

1. A method of localizing a geographic position of a radio receiver, the method comprising:

obtaining a current radio signature by scanning a contiguous range of frequencies in a frequency spectrum, wherein said current radio signature comprises a plurality of measured signal qualities that collectively represent said frequency spectrum, each measured signal quality in said plurality of measured signal qualities is for a corresponding frequency window in a plurality of frequency windows, wherein each respective frequency window in the plurality of frequency windows is for a predetermined range of frequencies in said contiguous range of frequencies, and wherein the signal quality of a respective frequency window in the plurality of frequency windows of the current radio signature is deemed to be the strongest signal measured in the predetermined range of frequencies in said respective frequency window; and comparing said current radio signature to a plurality of reference radio signatures, each reference radio signature in said plurality of reference radio signatures associated with a global position; wherein when said comparing identifies a unique match between said current radio signature and a reference radio signature in said plurality of reference radio signatures, said radio receiver is deemed to be localized to the global position associated with said reference radio signature.

2. The method of claim 1, wherein the frequency spectrum is all or a portion of the FM frequency spectrum.

3. The method of claim 1, wherein the frequency spectrum is all or a portion of the FM spectrum and all or a portion of the AM frequency spectrum.

4. The method of claim 1, wherein the frequency spectrum is all or a portion of the spectrum between 300 KHz and 3 MHz.

5. The method of claim 1, wherein the frequency spectrum is all or a portion of the spectrum between 3 MHz and 30 MHz.

6. The method of claim 1, wherein the frequency spectrum is all or a portion of the spectrum between 30 MHz and 300 MHz.

7. The method of claim 1, wherein the frequency spectrum is all or a portion of the spectrum between 300 MHz and 3000 MHz.

8. The method of claim 1, wherein a measured signal quality in said plurality of measured signal qualities is a decibel rating of a frequency in said frequency spectrum.

9. The method of claim 1, wherein a measured signal quality in said plurality of measured signal qualities is a voltage representing a frequency in said frequency spectrum.

10. The method of claim 1, wherein each frequency window in said plurality of frequency windows has a spectral width that is between 1 KHz and 200 KHz.

11. The method of claim 1, wherein each frequency window in said plurality of frequency windows has a spectral width that is between 200 KHz and 400 KHz.

12. The method of claim 1, wherein a spectral width of a first frequency window and a second frequency window in said plurality of frequency windows is the same.

13. The method of claim 1, wherein a spectral width of a first frequency window and a second frequency window in said plurality of frequency windows is different.

14. The method of claim 1, wherein a first measured signal quality and a second measured signal quality each correspond to a first frequency window in said plurality of frequency windows.

15. The method of claim 14, wherein the first measured signal quality and the second signal quality are each independently selected from the group consisting of an RDS quality, an FM multipath reading, FM level, AM level, and a phase lock.

16. The method of claim 1, wherein said plurality of reference radio signatures comprises between five reference radio signatures and one million reference radio signatures.

17. The method of claim 1, wherein said plurality of reference radio signatures comprises between one hundred reference radio signatures and fifty thousand reference radio signatures.

18. The method of claim 1, wherein said plurality of reference radio signatures comprises between five hundred reference radio signatures and twenty-five thousand reference radio signatures.

19. The method of claim 1, wherein each reference radio signature in said plurality of reference signatures corresponds to a unique global position in the United States, Canada, or Mexico.

20. The method of claim 1, wherein a reference radio signature in said plurality of reference radio signatures comprises a plurality of reference signal qualities, each reference signal quality in said plurality of reference signal qualities corresponding to a portion of the frequency spectrum.

21. The method of claim 20, wherein the portion of said frequency spectrum corresponding to a first reference signal quality in said plurality of reference signal qualities is a first frequency window.

22. The method of claim 21, wherein said first frequency window comprises a frequency spectrum that has a spectral width that is between 1 KHz and 200 KHz.

23. The method of claim 1, wherein said obtaining comprises scanning a predetermined range of frequencies to form a scan, and for each respective frequency in said predetermined range of frequencies in said scan, identifying a respective characteristic of said respective frequency.

24. The method of claim 23, wherein said characteristic of said frequency is a signal to noise ratio of said frequency or a signal strength of said frequency.

25. The method of claim 23, wherein said scanning is repeated a plurality of times to generate a plurality of scans and an average is taken of said respective characteristic of said respective frequency from said plurality of scans.

26. The method of claim 23, wherein said identifying a respective characteristic of said respective frequency comprises measuring said respective characteristic of said respective frequency for less than 1 second.

27. The method of claim 23, wherein said identifying a respective characteristic of said respective frequency comprises measuring said respective characteristic more than 500 times per second and averaging the result of each said measurement.

28. The method of claim 1, wherein said comparing said current radio signature only compares nonsaturated signal qualities in said plurality of measured signal qualities.

29. The method of claim 1, the method further comprising normalizing said current radio signature prior to said comparing.

30. The method of claim 1, the method further comprising removing a basal voltage present in said current radio signature.

31. The method of claim 1, wherein, when said comparing does not identify a unique match between said current radio signature and any reference radio signature in said plurality of reference radio signatures, the method further comprises identifying a reference radio signature in said one or more reference radios signatures that is geographically proximate to a global position assigned to a past radio signature of the radio receiver such that said radio receiver is deemed to be localized to the global position associated with said reference radio signature.

32. The method of claim 1, wherein said comparing comprises:

selecting an initial value for N, wherein N is any integer in the range 1 through M. wherein M is the number of measured signal qualities in said current radio signature;

eliminating each respective reference radio signature in said plurality of reference radio signatures that does not have an $N^{th}$ largest signal quality in the respective reference radio signature that is at the same frequency as the $N^{th}$ largest signal quality in said current radio signature; and repeating said eliminating step using a different value for N, with the proviso that N remains in the range 1 through M, until a single reference radio signature in said plurality of reference radio signatures has not been eliminated.

33. The method of claim 1, the method further comprising storing said plurality of reference radio signatures in a hash table prior to said obtaining step and said comparing step comprises a lookup of a reference radio signature in said hash table.

34. The method of claim 1, wherein said global position comprises a geometric polygon encompassing 50 square miles of area or less.

35. The method of claim 1, wherein said global position comprises a geometric polygon encompassing 5 square miles of area or less.

36. The method of claim 1, wherein said global position comprises a geometric polygon encompassing 1 square mile of area or less.

37. The method of claim 1, wherein said global position comprises a geometric polygon encompassing 5 contiguous acres of area or less.

38. The method of claim 1, the method further comprising providing information as a function of an identity of said reference radio signature that uniquely matches said current radio signature.

39. The method of claim 38, wherein said providing comprises using said identity of said reference radio signature to lookup a message in a radio display table; and
displaying said message.

40. The method of claim 39 wherein said message is related to traffic at a point within the global position of said reference radio signature that uniquely matches said current radio signature.

41. The method of claim 1, the method further comprising:

receiving a radio display table.

42. The method of claim 39 wherein said message includes text, an alarm, a sound, an audible message, an audible instruction, or a song.

43. The method of claim 1, the method further comprising populating said plurality of reference radio signatures.

44. The method of claim 43, wherein a reference radio signature in said plurality of radio signatures is populated using a propagation model.

45. The method of claim 43, wherein a reference radio signature in said plurality of radio signatures is populated using an empirical model.

46. The method of claim 1, wherein the current radio signature is expressed as an array that comprises a value for each frequency window within the contiguous range of frequencies that have been scanned by said obtaining step.

47. The method of claim 46, wherein the value for a respective frequency window in the array is a binary value that indicates a presence or absence of a signal in the respective frequency window.

48. The method of claim 46, wherein the value for a respective frequency window in the array indicates a signal strength measured in the respective frequency window.

49. The method of claim 1, wherein each reference radio signature in said plurality of reference radio signatures is expressed as an array that comprises a value for each frequency window within the contiguous range.

50. A device having a memory, the memory comprising:

a radio signature lookup table, said radio signature lookup table comprising a plurality of reference radio signatures that collectively represent a frequency spectrum, each reference radio signature in said plurality of reference radio signatures associated with a global position;

a radio signature measurement module for localizing a global position of a device, the radio signature measurement module comprising instructions for obtaining a current radio signature by scanning a contiguous range of frequencies in said frequency spectrum. wherein said current radio signature comprises a plurality of measured signal qualities, each measured signal quality in said plurality of measured signal qualities is for a corresponding frequency window in a plurality of frequency windows, wherein each respective frequency window in the plurality of frequency windows is for a predetermined range of frequencies in said contiguous range of frequencies, and wherein the signal quality of a frequency window in the plurality of frequency windows of the current radio signature is deemed to be the strongest signal measured in the predetermined range of frequencies in said respective frequency window; and a radio signature comparison module comprising instructions for comparing said current radio signature to said plurality of reference radio signatures, wherein the portion of said frequency spectrum corresponding to a first measured signal quality in said plurality of measured signal qualities is a first frequency window.

51. The device of claim 50, the memory further comprising:

instructions for accessing a radio display table, wherein said radio display table comprises information for each global position in a plurality of global positions; and a radio display module for obtaining information from said radio display table as a function of an identity of a reference radio signature uniquely identified by said instructions for comparing.

52. The device of claim 51, the memory further comprising a table update module, wherein said table update module comprises instructions for wirelessly updating information in said radio display table from a remote location.

53. The device of claim 50, the memory further comprising a table update module, wherein said table update module comprises instructions for updating a reference radio signature in said radio signature lookup table.

54. The device of claim 50, wherein said radio signature lookup table and said radio signature measurement module are embedded in one or more application specific integrated circuits (ASICs), one or more field-programmable gate arrays (FPGAs), or any combination thereof.

55. The device of claim 50, wherein said device comprises an ASIC or FPGA.

56. The device of claim 50, wherein said device is a component of an RDS or an HD radio.

57. The device of claim 50, the memory further comprising instructions for populating said radio signature lookup table.

58. The device of claim 57, wherein a reference radio signature in said radio signature lookup table is populated by said instructions for populating using a propagation model.

59. The device of claim 57, wherein a reference radio signature in said radio signature lookup table is populated by said instructions for populating using an empirical model.

60. The device of claim 50, wherein the current radio signature is expressed as an array that comprises a value for each frequency window within the contiguous range of frequencies that have been scanned by said obtaining step.

61. The device of claim 60, wherein the value for a respective frequency window in the array is a binary value that indicates a presence or absence of a signal in the respective frequency window.

62. The device of claim 60, wherein the value for a respective frequency window in the array indicates a signal strength measured in the respective frequency window.

63. The device of claim 60, wherein each reference radio signature in said plurality of reference radio signatures is expressed as an array that comprise a value for each frequency window within the contiguous range.

* * * * *